US 8,126,585 B2

(12) United States Patent
Yamaguchi

(10) Patent No.: US 8,126,585 B2
(45) Date of Patent: Feb. 28, 2012

(54) COLLISION PREVENTING DEVICE INCORPORATED IN NUMERICAL CONTROL APPARATUS

(75) Inventor: Takahiro Yamaguchi, Aichi (JP)

(73) Assignee: Okuma Corporation, Aichi (JP)

( * ) Notice: Subject to any disclaimer, the term of this patent is extended or adjusted under 35 U.S.C. 154(b) by 362 days.

(21) Appl. No.: 12/573,611

(22) Filed: Oct. 5, 2009

(65) Prior Publication Data

US 2010/0087948 A1 Apr. 8, 2010

(30) Foreign Application Priority Data

Oct. 6, 2008 (JP) .................................. 2008-259753

(51) Int. Cl.
*G06F 19/00* (2006.01)
*G06G 7/48* (2006.01)
(52) U.S. Cl. ............................................. 700/178; 703/7
(58) Field of Classification Search .................. 700/177, 700/178; 703/7
See application file for complete search history.

(56) References Cited

U.S. PATENT DOCUMENTS

| | | | | |
|---|---|---|---|---|
| 4,821,201 | A * | 4/1989 | Kawamura et al. | 700/177 |
| 4,833,617 | A * | 5/1989 | Wang | 700/173 |
| 6,856,853 | B2 * | 2/2005 | Takahashi et al. | 700/178 |
| 7,805,285 | B2 * | 9/2010 | Fukaya et al. | 703/2 |
| 2006/0041325 | A1 | 2/2006 | Naganawa et al. | |
| 2009/0062955 | A1 * | 3/2009 | Ide et al. | 700/178 |
| 2010/0036519 | A1 * | 2/2010 | Yamada et al. | 700/173 |
| 2011/0035044 | A1 * | 2/2011 | Takahashi et al. | 700/178 |

FOREIGN PATENT DOCUMENTS

| | | |
|---|---|---|
| JP | 2006-59187 | 3/2006 |
| JP | 2007-172068 | 7/2007 |

OTHER PUBLICATIONS esp@cenet patent abstracts for Japanese Publication No. 2006059187, Publication date Mar. 2, 2006 (1 page).
esp@cenet patent abstract for Japanese Publication No. 2007172068, Publication date Jul. 5, 2007 (1 page).

* cited by examiner

*Primary Examiner* — Ryan Jarrett
(74) *Attorney, Agent, or Firm* — Osha • Liang LLP

(57) ABSTRACT

A collision preventing device includes an acceleration/deceleration simulating unit 30 that performs acceleration/deceleration processing based on a moving command generated by a function generation unit 16 according to a method similar to that used by acceleration/deceleration units 18x and 18z and obtains a moving path resulting from the acceleration/deceleration processing, an interference check unit 34 that performs interference check between a mobile member and an interfering object along the moving path generated by the acceleration/deceleration simulating unit 30 and determines whether any interference may occur, a delay unit 32 that successively stores moving commands generated by the function generation unit 16 and successively outputs a moving command having been stored a predetermined time before, and a moving command blocking unit 36 that sends the moving command output from the delay unit 32 to the acceleration/deceleration units 18x and 18z if the interference check unit 34 determines that there is no interference, and blocks the moving command to be sent from the delay unit 32 to the acceleration/deceleration units 18x and 18z if the interference check unit 34 determines that interference may occur.

6 Claims, 26 Drawing Sheets

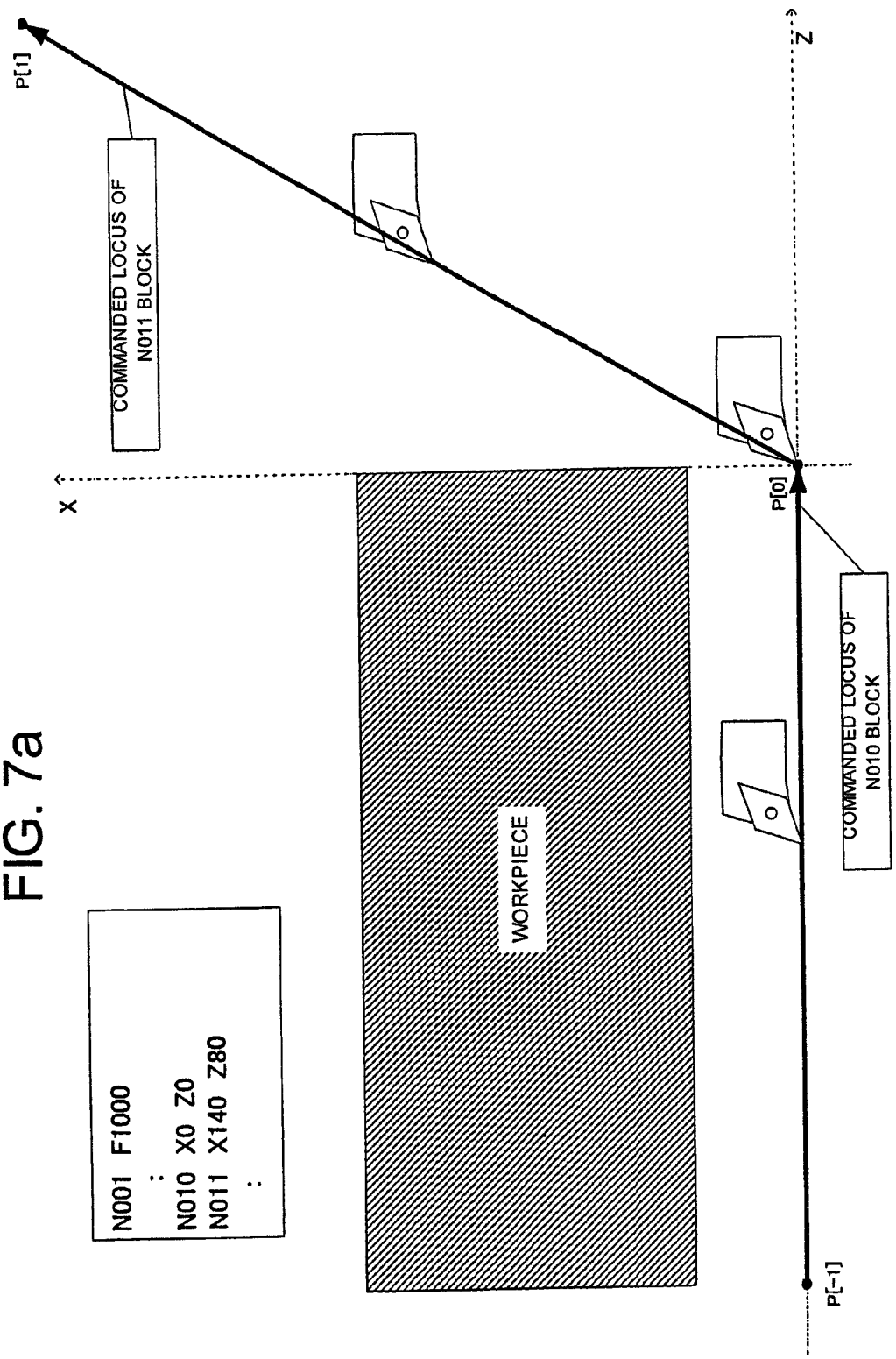

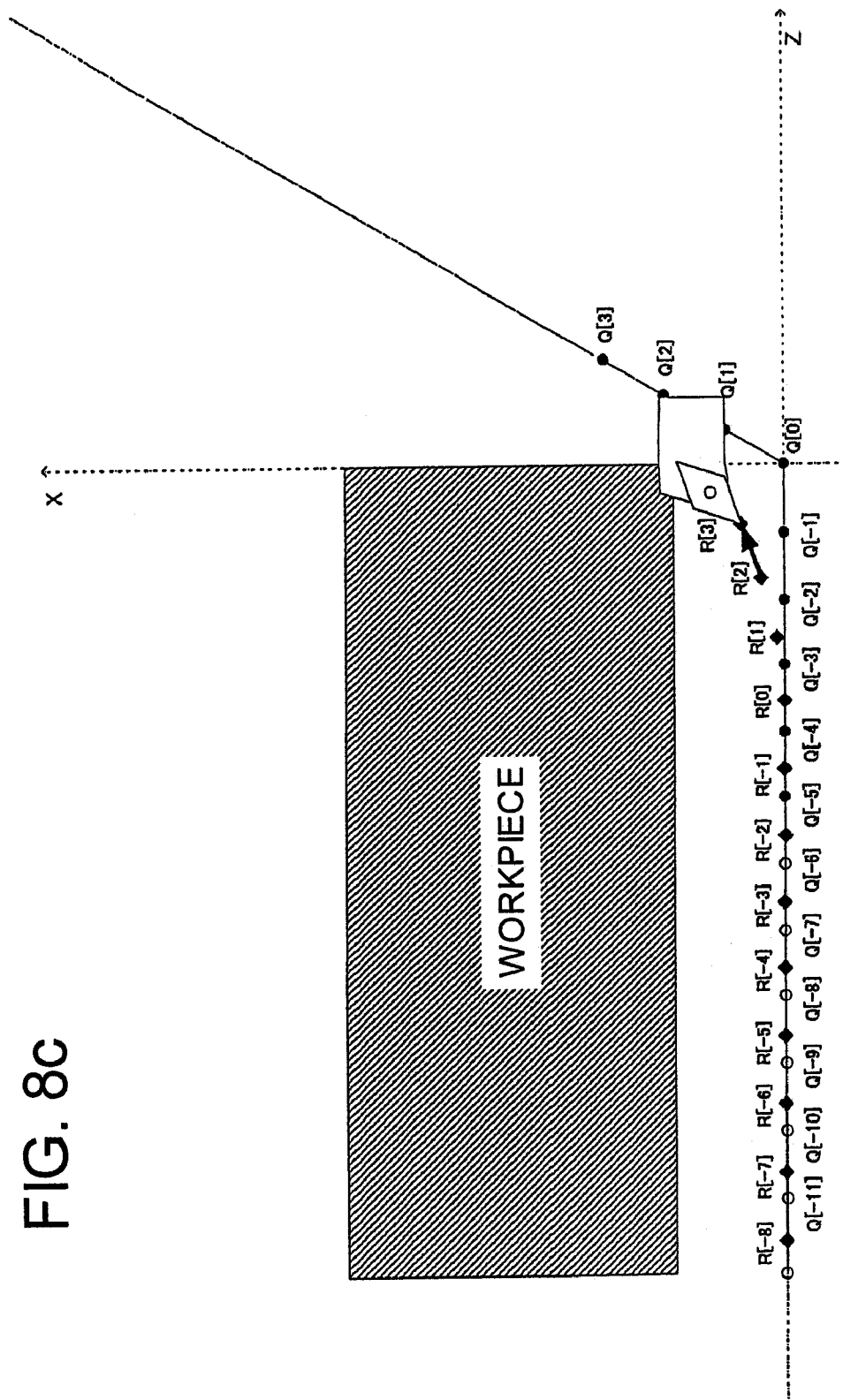

COLLISION PREVENTING DEVICE INCORPORATED IN NUMERICAL CONTROL APPARATUS

CROSS-REFERENCE TO RELATED APPLICATIONS

This application claims priority from Japanese Patent Application No. 2008-259753 filed on Oct. 6, 2008, the entire disclosure of which is incorporated herein by reference.

TECHNIQUE FIELD

The present invention relates to a collision preventing device incorporated in a numerical control apparatus.

BACKGROUND ART

FIG. 6 illustrates a configuration of a collision preventing device incorporated in a numerical control apparatus according to conventional art. Although a machine tool itself is not illustrated in the drawing, the machine tool includes a driving mechanism configured to change a relative position between a tool and a workpiece to be processed in two directions, i.e., a Z-axis and an X-axis.

A program interpretation unit 12 reads a part program 10 on a block-by-block basis to control the numerical control apparatus, and interprets command values such as a commanded path and a commanded feed speed, and then generates execution data that can be executed by a function generation unit 16. A buffer 14 stores the execution data generated by the program interpretation unit 12. The buffer 14 functions as a device capable of temporarily storing the execution data generated in advance by executing the above-described interpretation processing that takes a relatively long time. The buffer 14 can reduce a time difference relative to the time required for function generation of one block, and can realize smooth execution of the processing.

The function generation unit 16 successively reads the execution data stored in the buffer 14, and performs interpolation at constant time intervals (function generation periods) along the commanded path included in the execution data at the commanded feed speed until an interpolation point reaches a target position indicated by the execution data.

The function generation unit 16 converts the interpolation point into a moving command for a function generation period and divides the moving command into x-axis and Z-axis commands. An X-axis driving unit 17$x$ includes an acceleration/deceleration unit 18$x$. A Z-axis driving unit 17$z$ includes an acceleration/deceleration 18$z$. The acceleration/deceleration units 18$x$ and 18Z can perform acceleration/deceleration processing at a predetermined time constant without giving any unnecessary impact on a workpiece in a machining operation, and send command signals to servo units 20$x$ and 20$z$, respectively. The servo units 20$x$ and 20$z$ perform feedback control according to the given commands for respective motors that drive the machine based on detection signals of associated detectors (see a motor/detector 22$x$ and a motor/detector 22$z$).

To prevent the machine tool from colliding with any interfering object, the apparatus illustrated in FIG. 6 does not execute function generation processing for a target block if it is determined that any collision may occur in the target block when the machine tool performs an operation according to the part program 10.

An interference checking unit 26 constructs a mobile member based on model data 24 in a virtual space, then moves the constructed mobile member along the commanded path included in the execution data, and checks for the possibility of any interference. The model data 24 is a data group including numerical values representing movable portions and variable portions of the machine tool, such as shapes of a machine tool body, feed shafts, tools, and workpieces. The interference checking unit 26 determines whether any interference may occur in each block, and successively stores predicted interference information as a part of the execution data in the buffer 14.

An execution managing unit 28 causes the function generation unit 16 to execute interpolation processing if no interference is detected in a presently executed block. On the other hand, the execution managing unit 28 inhibits the function generation unit 16 from executing interpolation processing if it is determined that any interference may occur, and generates a warning.

Citation List
Patent Literature 1
Japanese Patent Laid-Open Application No. 2006-59187

SUMMARY OF INVENTION

Technical Problem

The collision preventing device incorporated in a numerical control apparatus according to the conventional art illustrated in FIG. 6 has a problem that even when it is determined that no interference occurs, the interference may actually occur. The locus to be checked by the interference checking unit 26 is the path commanded by the part program 10 (see FIG. 7$a$). However, an actual movement of the machine (i.e., an actual moving path of a tool moved by driving motors) may be different from the commanded path.

The numerical control apparatus illustrated in FIG. 6 is a general type that includes a plurality of axis driving units, which are configured to perform acceleration/deceleration processing for respective axes based on function generation. However, as illustrated in FIG. 7$b$, an actual moving path does not coincide with the commanded path. According to the example illustrated in FIG. 7$b$, moving commands are continuous and the moving direction changes at an intermediate position. In this case, an actual tool locus deviates from a commanded locus in the vicinity of the direction changing position because the apparatus independently performs acceleration/deceleration processing for each axis. Therefore, even in a case where no interference is detected along the commanded path, the actual moving path may cause interference because of the above-described difference.

The present invention intends to provide a collision preventing device that can accurately prevent any collision considering the possibility that an actual moving locus may deviate from a commanded locus.

Solution to Problem

According to an aspect of the present invention, a collision preventing device incorporated in a numerical control apparatus includes a function generation unit that generates a moving command; an acceleration/deceleration processing unit that performs acceleration/deceleration processing of the moving command generated by the function generation unit for each axis to reduce an impact that may occur when a machine tool operates; a unit that performs interference check on a commanded path in advance and, if it is determined that interference may occur, prevents any collision by inhibiting the function generation unit from generating the moving command; an acceleration/deceleration simulating unit that performs acceleration/deceleration processing on the moving command generated by the function generation unit according to a method similar to that used by the acceleration/deceleration processing unit and obtains a moving path resulting from the acceleration/deceleration processing; an interference check unit that performs interference check between a mobile member and an interfering object along the moving path generated by the acceleration/deceleration simulating unit and determines whether any interference may occur; a delay unit that successively stores moving commands generated by the function generation unit and successively outputs a moving command having been stored a predetermined time before; and a moving command blocking unit that sends the moving command output from the delay unit to the acceleration/deceleration processing unit if the interference check unit determines that there is no interference and blocks the moving command to be sent from the delay unit to the acceleration/deceleration processing unit if the interference check unit determines that interference may occur, wherein the collision preventing device performs the interference check not only for the commanded path but also for the moving path output from the acceleration/deceleration simulating unit.

According to another aspect of the present invention, a collision preventing device incorporated in a numerical control apparatus includes a function generation unit that generates a moving command based on a numerical control program; an acceleration/deceleration processing unit that performs acceleration/deceleration processing of the moving command generated by the function generation unit for each axis to reduce an impact that may occur when a machine tool operates; a unit that performs interference check on a commanded path in advance and, if it is determined that interference may occur, prevents any collision by inhibiting the function generation unit from generating the moving command; a local simulation unit that simulates the function generation unit and the acceleration/deceleration processing unit according to a numerical control program in the vicinity of a target position commanded by the numerical control program; and a check target selection unit that selects a path to be subjected to the interference check based on the locus obtained by the local simulation unit and a linearization allowance amount that is designated beforehand, wherein the collision preventing device performs interference check between a mobile member and an interfering object along the selected path.

According to another aspect of the present invention, a collision preventing device incorporated in a numerical control apparatus includes a function generation unit that generates a moving command based on a numerical control program; an acceleration/deceleration processing unit that performs acceleration/deceleration processing of the moving command generated by the function generation unit for each axis to reduce an impact that may occur when a machine tool operates; a unit that performs interference check on a commanded path in advance and, if it is determined that interference may occur, prevents any collision by inhibiting the function generation unit from generating the moving command; a simulation unit that simulates the function generation unit and the acceleration/deceleration processing unit according to the numerical control program; and a commanded path changing unit that changes a path of execution data so as to cancel a difference between the commanded path and the path obtained by the simulation unit, wherein the collision preventing device executes function generation based on the path changed by the commanded path changing unit and performs an operation along a moving path adjacent to the commanded path having been subjected to the interference check.

According to another aspect of the present invention, a collision preventing device incorporated in a numerical control apparatus includes a function generation unit that generates a moving command; an acceleration/deceleration processing unit that performs acceleration/deceleration processing of the moving command generated by the function generation unit for each axis to reduce an impact that may occur when a machine tool operates; a unit that performs interference check on a commanded path in advance and, if it is determined that interference may occur, prevents any collision by inhibiting the function generation unit from generating the moving command; a deviation suppression feed speed determination unit that determines a feed speed to suppress a deviation within a predetermined clearance; and a deviation suppression feeding unit that controls the function generation unit to generate a moving command according to the feed speed determined by the deviation suppression feed speed determination unit, wherein the collision preventing device performs an operation along a moving path whose deviation relative to the commanded path having been subjected to the interference check is within a predetermined clearance.

According to another aspect of the present invention, a collision preventing device incorporated in a numerical control apparatus includes a function generation unit that generates a moving command based on a numerical control program; an acceleration/deceleration processing unit that performs acceleration/deceleration processing of the moving command generated by the function generation unit for each axis to reduce an impact that may occur when a machine tool operates; a unit that performs interference check on a commanded path in advance and, if it is determined that interference may occur, prevents any collision by inhibiting the function generation unit from generating the moving command; a deviation suppression waiting number-of-times table that stores a deviation suppression waiting number-of-times according to a direction turning angle of the commanded path; a deviation suppression waiting number-of-times determination unit that selects a waiting number-of-times corresponding to a direction turning angle from the deviation suppression waiting number-of-times table when a command of the numerical control program is interpreted; and a deviation suppression waiting managing unit that delays start timing of function generation by an amount corresponding to the waiting number-of-times selected by the deviation suppression waiting number-of-times determination unit, wherein the collision preventing device performs an operation along a moving path whose deviation relative to the commanded path having been subjected to the interference check is within a predetermined clearance.

According to an embodiment of the above-described aspect, the collision preventing device further includes a deviation suppression waiting number-of-times table generation unit that evaluates a deviation amount by simulating the function generation unit and the acceleration/deceleration processing unit of each axis and registers a maximum function generation start waiting number-of-times, which is within the clearance, in the deviation suppression waiting number-of-times table.

Advantageous Effects of Invention

According to one aspect of the present invention, the collision preventing device can perform interference check on a moving locus deviated from a commanded locus. Therefore, the collision preventing device can accurately detect the possibility of any interference. In other words, decreasing the possibility of collision brings an effect of increasing the working efficiency of the machine by an amount of, for example, the time required for recovery (e.g., repair of the machine), and therefore improving the productivity of the machine.

According to another aspect of the present invention, the collision preventing device performs interference check considering moving locus that may deviate from a commanded locus. Therefore, compared to the conventional apparatus, the collision preventing device can accurately detect the possibility of any interference. In other words, decreasing the possibility of collision brings an effect of increasing the working efficiency of the machine by an amount of, for example, the time required for recovery (e.g., repair of the machine), and therefore improving the productivity of the machine. Moreover, according to another aspect of the present invention, the collision preventing device can reduce the amount of processing required for the interference check and can therefore reduce the costs for the apparatus.

BRIEF DESCRIPTION OF THE DRAWINGS

FIG. 7a illustrates an example of a commanded path.

FIG. 7b illustrates an actual moving path of the conventional apparatus relative to the commanded path illustrated in FIG. 7a.

FIG. 8c illustrates functions and effects of the collision preventing device according to the first embodiment.

DESCRIPTION OF EMBODIMENTS

Figure 1:
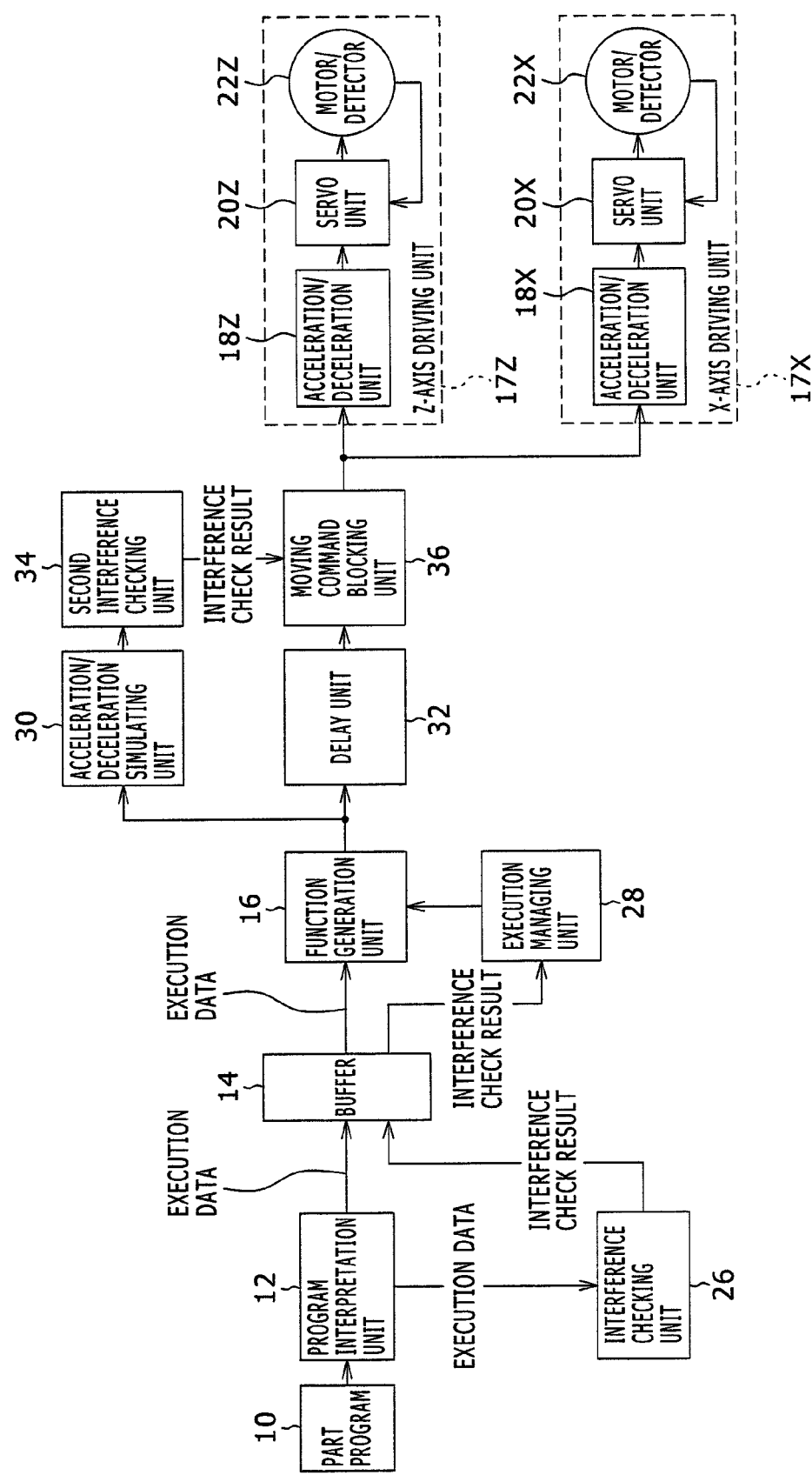
FIG. 1 is a functional block diagram illustrating an example of a configuration of a collision preventing device incorporated in a numerical control apparatus according to a first embodiment.
Figure 6:
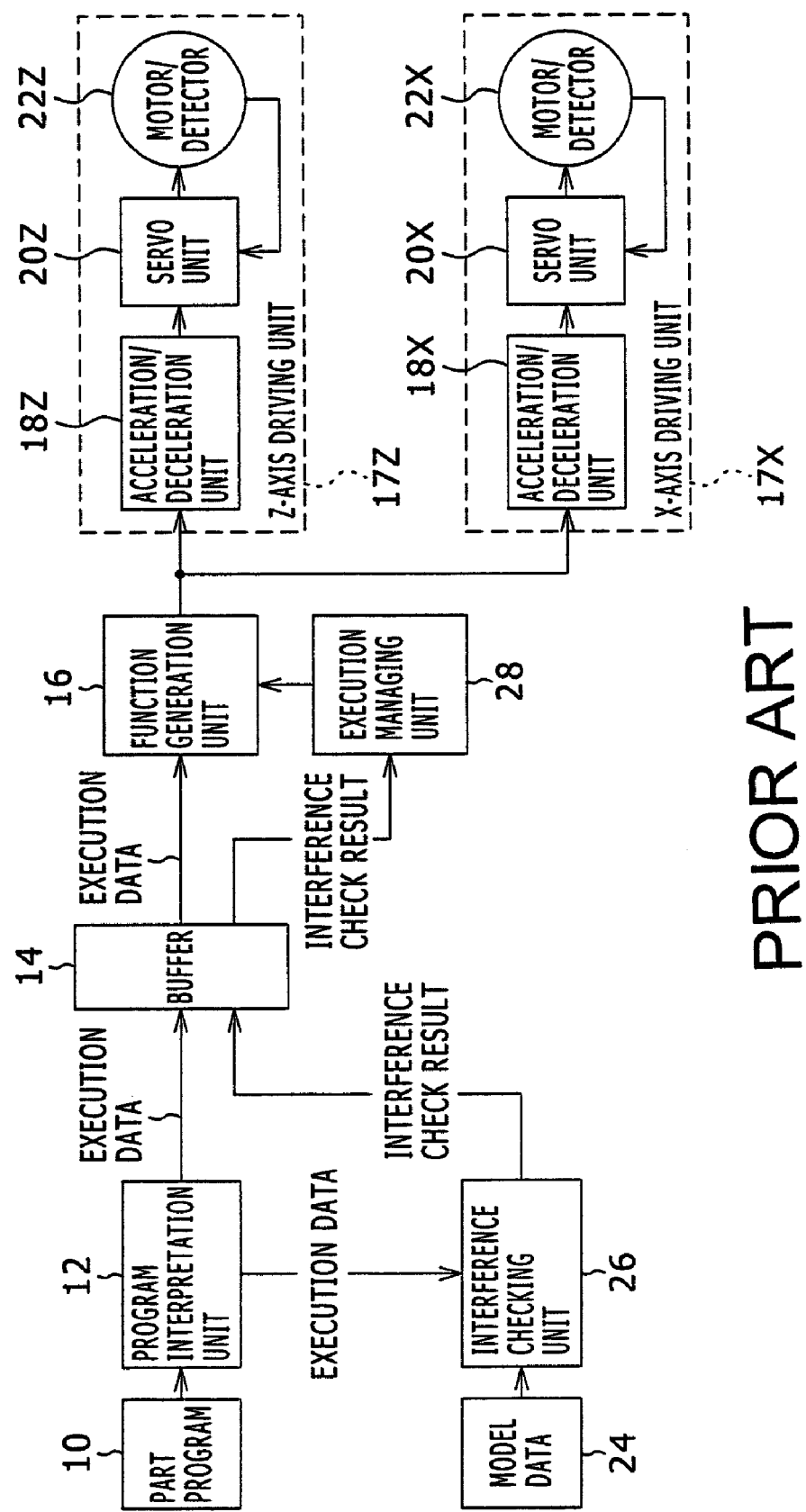
FIG. 6 is a functional block diagram illustrating a configuration of a collision preventing device incorporated in a numerical control apparatus according to a conventional apparatus.

FIG. 1 illustrates a configuration of a collision preventing device incorporated in a numerical control apparatus according to an embodiment of the invention, which relates to claim 1. In FIG. 1, constituent components similar to those of the conventional art illustrated in FIG. 6 are denoted using the same reference numerals and names.

The collision preventing device according to the present embodiment can execute interference check on a commanded locus according to a method similar to that described in the conventional art. If it is determined that any interference may occur in a target block, the collision preventing device does not execute function generation processing for the target block and stops a machine tool before the machine tool collides with an interfering object. If it is determined that there is no interference in the target block, the collision preventing device executes function generation processing for the target block and outputs a moving command for each function generation period.

The collision preventing device according to the above-described conventional art sends a moving command generated from the function generation unit 16 in each function generation period to respective axis driving units 17$x$ and 17$z$. On the other hand, the collision preventing device according to the present embodiment sends the moving command to an acceleration/deceleration simulating unit 30 and a delay unit 32.

The delay unit 32 temporarily stores a moving command generated in each function generation period and successively outputs the moving command having been stored a predetermined time constant before. In this embodiment, the time constant is comparable with the time constant used by the acceleration/deceleration units 18$x$ and 18$z$ in the axis driving units 17$x$ and 17$z$. In short, the delay unit 32 can delay each moving command received from the function generation unit 16 by an amount corresponding to the time constant.

The acceleration/deceleration simulating unit 30 performs processing similar to that performed by the acceleration/deceleration units 18x and 18z provided in respective axis driving units 17x and 17z. Although not illustrated in the drawings, the acceleration/deceleration simulating unit 30 divides the moving command into an X-axis component and a Z-axis component and performs acceleration/deceleration processing for respective axes in a manner similar to that performed by respective axis driving units 17x and 17z. In general, a deviation of a moving locus relative to a commanded locus is caused by acceleration/deceleration processing independently performed for respective axes. Therefore, the acceleration/deceleration simulating unit 30 according to the present embodiment has a function of checking the moving locus beforehand.

A second interference checking unit 34 executes interference check on the moving locus obtained by the acceleration/deceleration simulating unit 30. The second interference checking unit 34 is similar to the interference checking unit 26 in the content of processing to be performed, although the locus to be input is different. The second interference checking unit 34 according to the present embodiment determines the possibility of any interference that may occur based on model data (not illustrated).

If it is determined that there may be interference, the second interference checking unit 34 notifies a moving command blocking unit 36 of the possibility of the detected interference. In this case, the moving command blocking unit 36 blocks a moving command to be output from the delay unit 32. When no moving command is supplied, the machine tool stays at a position designated by the final moving command.

If it is determined that there is no interference, the second interference checking unit 34 notifies the moving command blocking unit 36 of no possibility of causing any interference. In this case, the moving command blocking unit 36 sends the moving command output from the delay unit to respective axis driving units 17x and 17z without blocking the moving command. Therefore, the machine tool can continuously move in both the x-axis and z-axis directions.

Figure 7B:
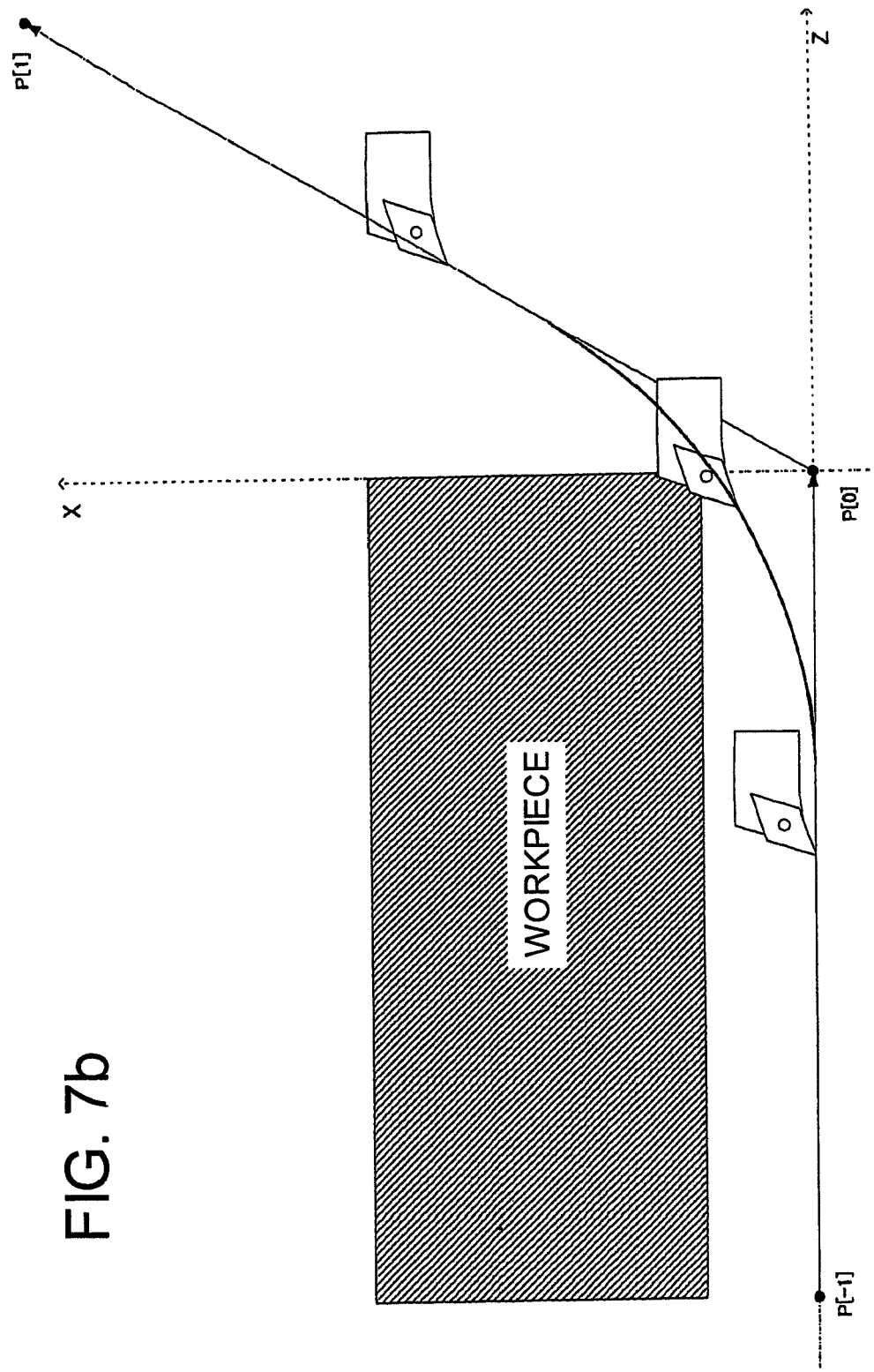

An operation of the collision preventing device according to the present embodiment to be performed in a situation illustrated in FIG. 7b is described below with reference to FIGS. 8a to 8d. In the present embodiment, the acceleration/deceleration units 18x and 18z and the acceleration/deceleration simulating unit 30 have a similar time constant composed of eight periods.

In the illustrated case, no interference occurs in the first N010 block (i.e., a commanded path extending from a position P[−1] to a position P[0]). If it is determined that any interference may occur in the N010 block, the function generation unit 16 does not perform function generation processing for the N010 block. Therefore, the machine tool stops at the position P[−1]. As no interference occurs in the N010 block, the function generation unit 16 performs function generation processing for the N010 block so that the machine tool can move from the position P[−1] to the position P[0]. The function generation unit 16 successively outputs commands (i.e., . . . Q[−3], Q[−2], Q[−1], and Q[0]) in sequential function generation periods to the delay unit 32 and the acceleration/deceleration simulating unit 30.

The acceleration/deceleration simulating unit 30 receives the commands (i.e., . . . Q[−2], Q[−1], and Q[0]) in respective function generation periods and successively performs acceleration/deceleration processing and outputs commanded positions (i.e., . . . R[−2], R[−1], and R[0]) to the second interference checking unit 34.

Figure 8A:
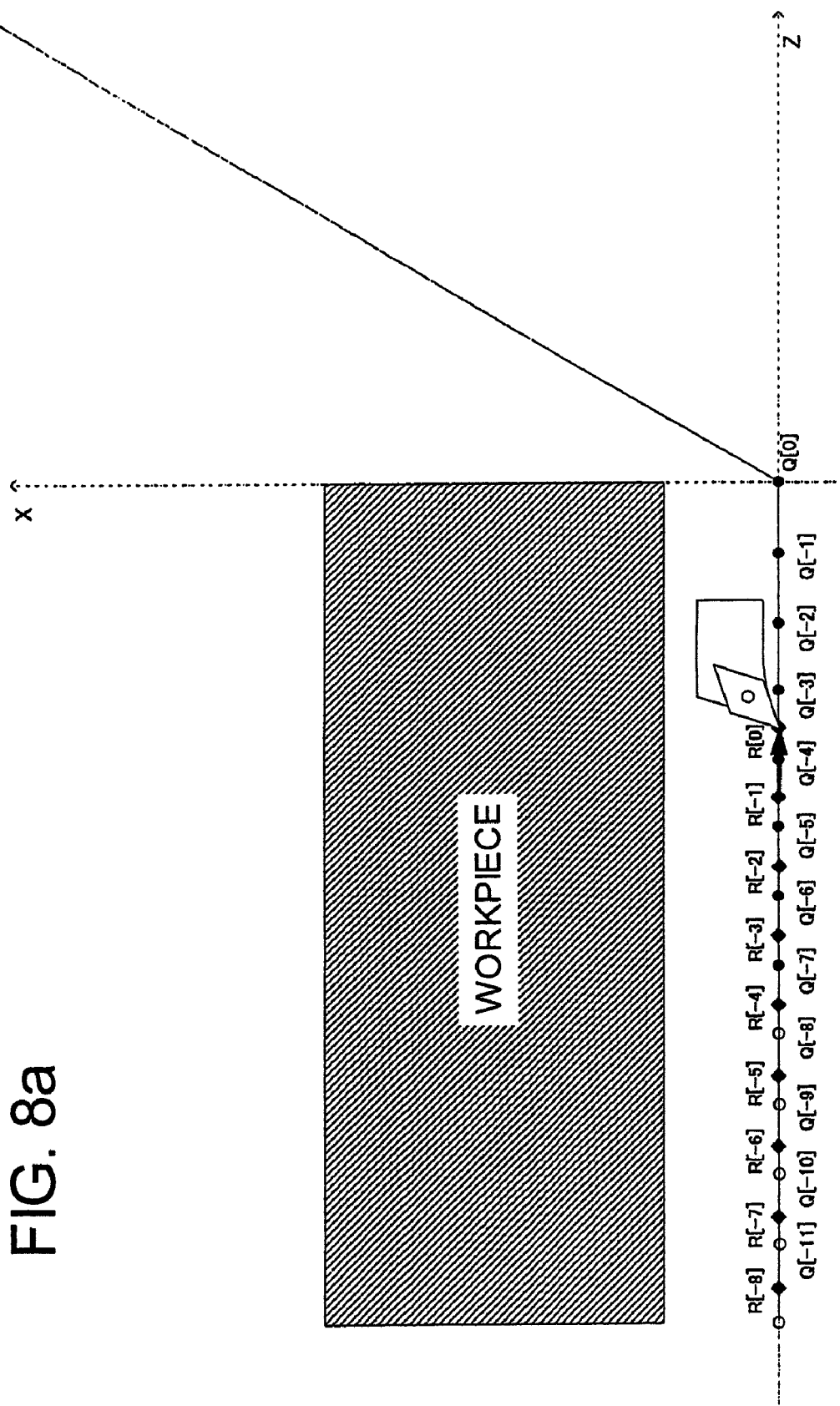
FIG. 8a illustrates functions and effects of the collision preventing device according to the first embodiment.

The second interference checking unit 34 checks, in respective function generation periods, any interference that may occur on the path connecting commanded positions R[−3]→R[−2], R[−2]→R[−1], and R[−1]→R[0]. In the illustrated example, no interference occurs on the simulation path. Therefore, the moving command blocking unit 36 transfers each output of the delay unit 32 to respective axis driving units 17x and 17z. The output of the delay unit 32 is a command received a predetermined time before, which corresponds to the time constant (i.e., eight periods). Namely, the delay unit 32 sequentially outputs the commands . . . Q[−10]→Q[−9]→Q[−8]. FIG. 8a illustrates a result of the function generation processing for the N010 block. In FIG. 8a, an illustration of the tool indicates a status of interference check in the period of function generation of Q[0], i.e., on the path extending from the position R[−1] to the position R[0]. In FIG. 8a, the commanded positions Q[−10], Q[−9], and Q[−8] output to respective axis driving units 17x and 17z are indicated by white circles. More specifically, at the time illustrated in FIG. 8a, a target to be subjected to the interference check by the second interference checking unit 34 in the period of the function generation of Q[0] is the path extending from the position R[−1] to the position R[0]. In this case, the delay unit 32 outputs the command Q[−8], which does not cause any interference. Therefore, the moving command blocking unit 36 transfers the command Q[−8] to respective axis driving units 17x and 17z.

Figure 8B:
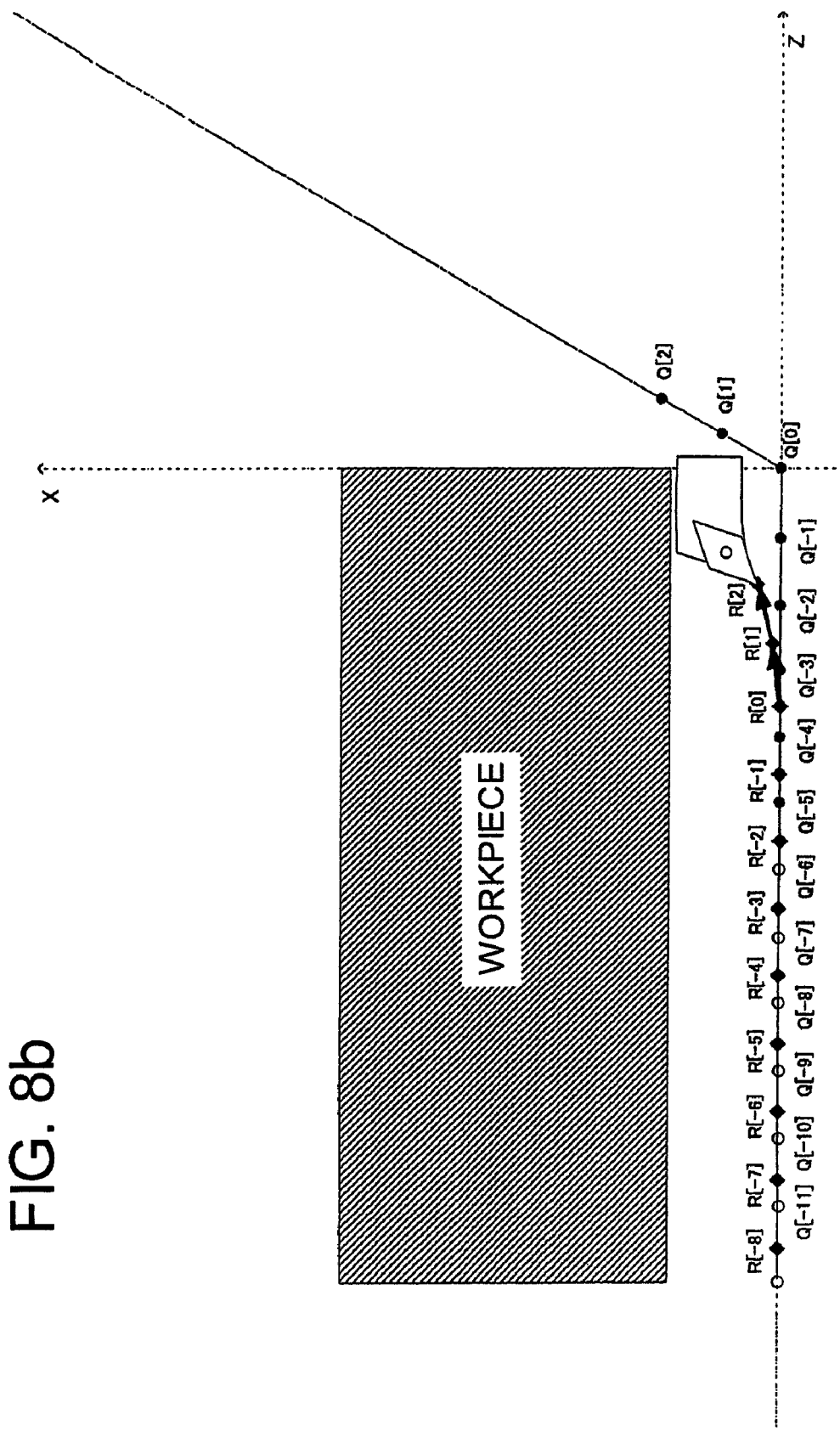
FIG. 8b illustrates functions and effects of the collision preventing device according to the first embodiment.

In the present case, no interference occurs in the next N011 block (i.e., a commanded path extending from the position P[0] to a position P[1]). Therefore, the function generation unit 16 starts function generation processing for the next N011 block. No interference occurs on the simulation path connecting the positions R[0]→R[1]→R[2] at the time when function generation processing for the command Q[2] is completed. Therefore, as described above, the moving command blocking unit 36 successively transfers the commands Q[−8], Q[−7], and Q[−6] to respective axis driving units 17x and 17z. FIG. 8b illustrates a result of the operation at the time when the function generation of Q[2] in the N011 block is completed. In FIG. 8b, an illustration of the tool indicates a status of interference check. In FIG. 8b, the commanded positions Q[−7] and Q[−6] output to respective axis driving units 17x and 17z are indicated by white circles. More specifically, at the time illustrated in FIG. 8b, targets to be subjected to the interference check by the second interference checking unit 34 in the periods of the function generation of Q[1] and Q[2] are the path extending from the position R[0] to the position R[1] and the path extending from the position R[1] to the position R[2], respectively. The outputs of the delay unit 32 corresponding to these targets are the commands Q[−7] and Q[−6]. Therefore, no interference occurs. The moving command blocking unit 36 transfers the commands Q[−7] and Q[−6] to respective axis driving units 17x and 17z.

Figure 8D:
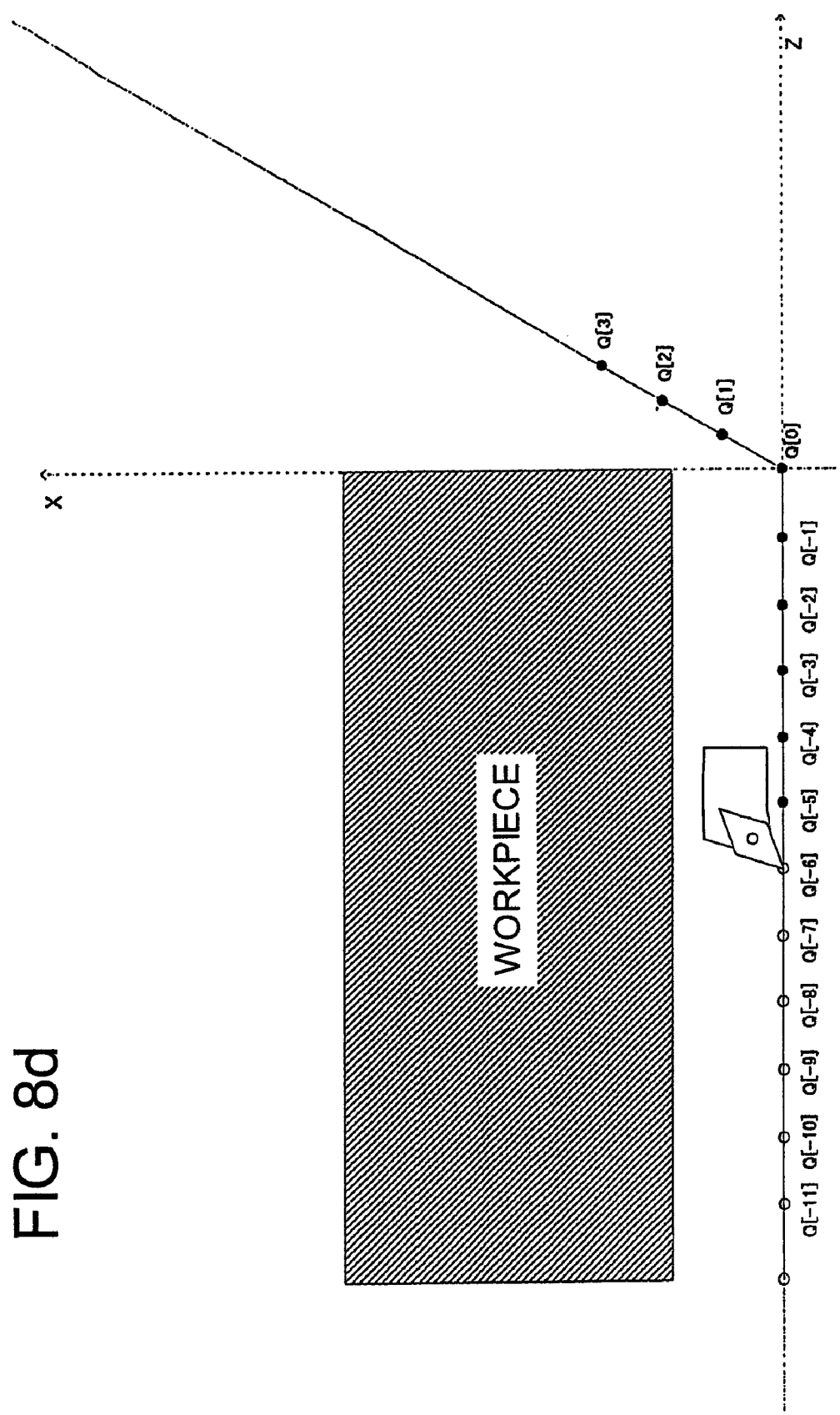
FIG. 8d illustrates functions and effects of the collision preventing device according to the first embodiment.

Then, the function generation unit 16 outputs a command Q[3] in the next function generation processing and obtains a simulation path extending from the position R[2] to the position R[3]. However, according to the illustrated example, the second interference checking unit 34 detects an interference that may occur on the obtained simulation path (see FIG. 8c). In this case, the moving command blocking unit 36 receives a notice of the possible interference from the second interference checking unit 34. The moving command blocking unit 36 inhibits the output of the delay unit 32 from changing to a command Q[−5] from the command Q[−6]. More specifically, the position command supplied to respective axis driving units 17x and 17z remains the same (i.e., Q[−6]). As the machine maintains this state once the moving command blocking unit 36 blocks the output of the delay unit 32, the movement of the machine tool converges to and stops at Q[−6]. As illustrated in FIG. 8*d*, an actual tool position stays at the position corresponding to the command Q[−6]. In other words, the present embodiment can prevent the machine tool from colliding with any interfering object on the actual moving path.

Figure 2:
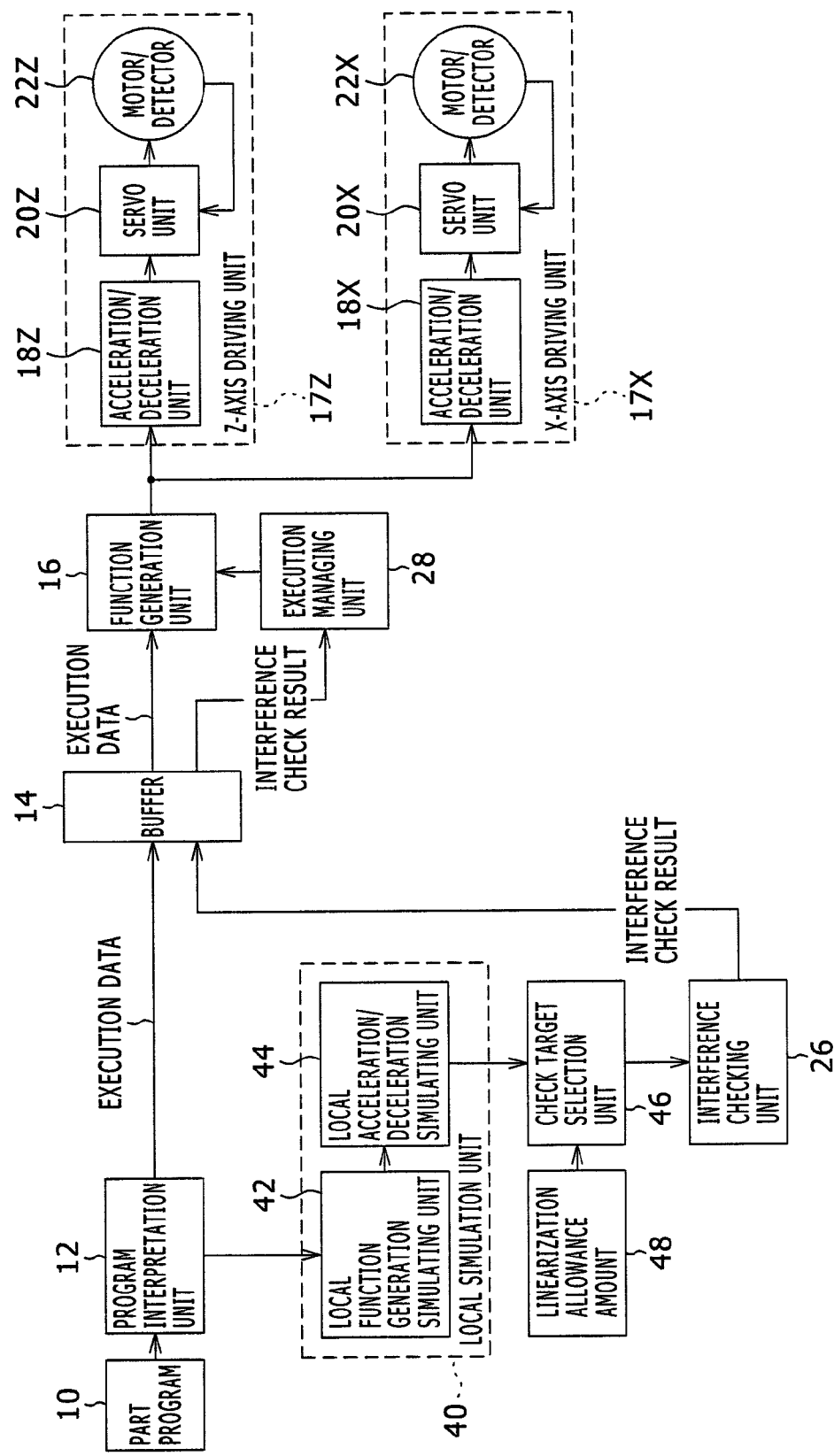
FIG. 2 is a functional block diagram illustrating an example of a configuration of a collision preventing device incorporated in a numerical control apparatus according to a second embodiment.

FIG. 2 illustrates a configuration of a collision preventing device incorporated in a numerical control apparatus according to another embodiment of the present invention, which relates to claim 2. In FIG. 2, constituent components similar to those of the conventional art illustrated in FIG. 6 are denoted using the same reference numerals and names.

Similar to the above-described conventional apparatus, the collision preventing device according to the present embodiment executes interference check on a commanded locus. In addition, the collision preventing device according to the present embodiment executes interference check on a deviated moving locus. To this end, a below-described local simulation unit 40 selects the deviated moving locus to be subjected to the interference check from a plurality of loci obtained beforehand. In this case, the deviated moving locus to be selected by the local simulation unit 40 is within a predetermined allowable range.

As a result, if it is determined that any interference may occur in a target block, the collision preventing device does not execute function generation processing for the target block and stops the machine tool before the machine tool collides with an interfering object. If it is determined that there is no interference in the target block, the collision preventing device executes function generation processing for the target block and outputs a moving command for each function generation period.

An operation of the collision preventing device according to the present embodiment to be performed in a case where a path illustrated in FIG. 7*a* is commanded by the part program 10 is described below with reference to FIGS. 9*a* to 9*d*.

Figure 9A:
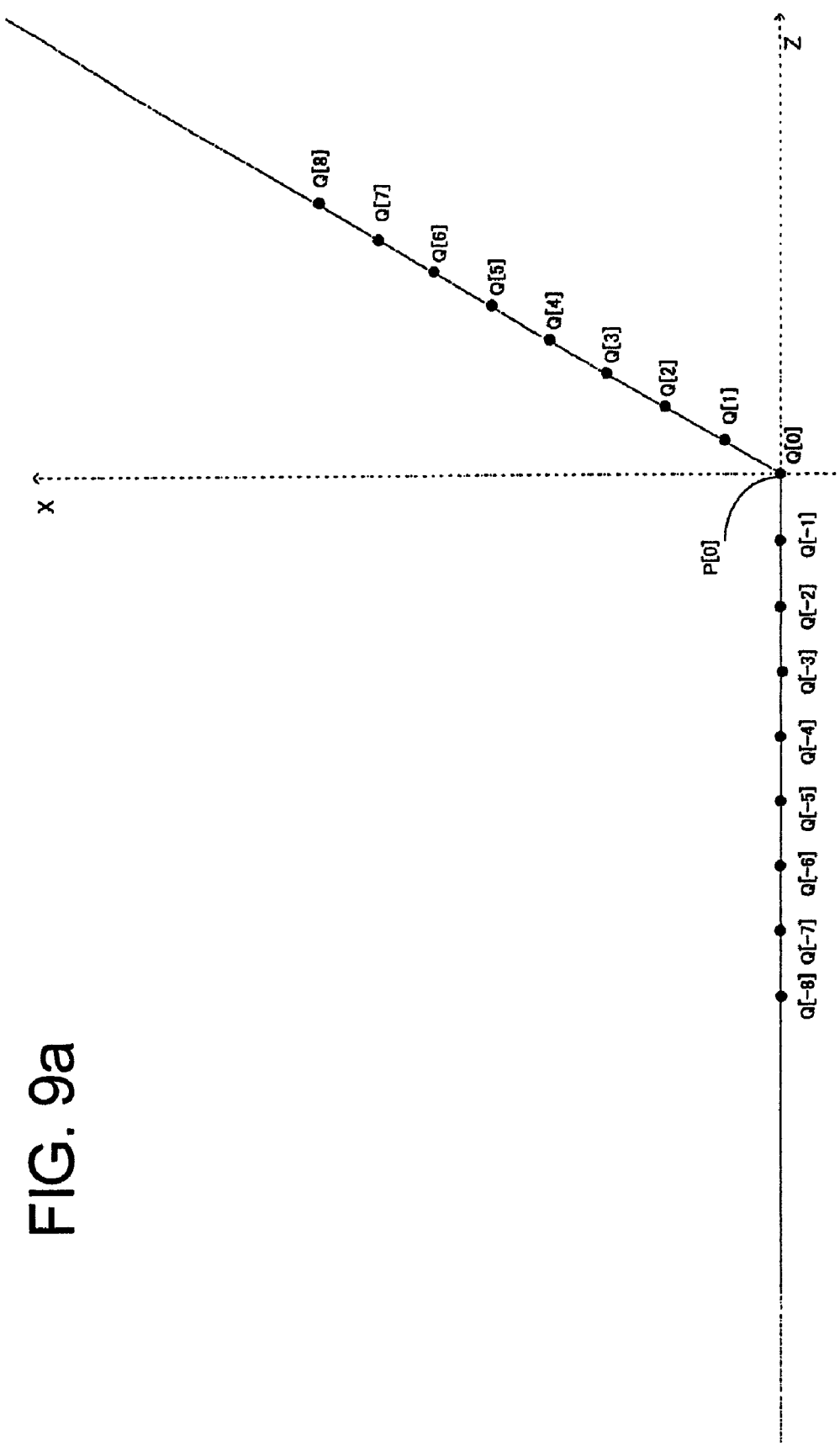
FIG. 9a illustrates functions and effects of the collision preventing device according to the second embodiment.

The local simulation unit 40 includes a local function generation simulating unit 42 and a local acceleration/deceleration simulating unit 44. The local function generation simulating unit 42 can perform interpolation along a commanded moving path according to a method similar to that used by the function generation unit 16. The interpolation to be performed by the local function generation simulating unit 42 is limited to the target position P[0] and the vicinity thereof. In this respect, the local function generation simulating unit 42 is different from the function generation unit 16 that performs interpolation on the entire command region of the target block. As illustrated in FIG. 9*a*, the local function generation simulating unit 42 performs interpolation in a limited range extending from the target position P[0] toward the P[−1] direction by an amount corresponding to an acceleration/deceleration time constant T as well as a limited range extending from the target position P[0] toward the P[+1] direction by the same amount corresponding to the acceleration/deceleration time constant T. Thus, the local function generation simulating unit 42 can determine interpolation points ranging from Q[−T] to Q[+T]. According to the example illustrated in FIG. 9*a*, the acceleration/deceleration time constant T is equal to 8 (i.e., T=8).

Figure 9B:
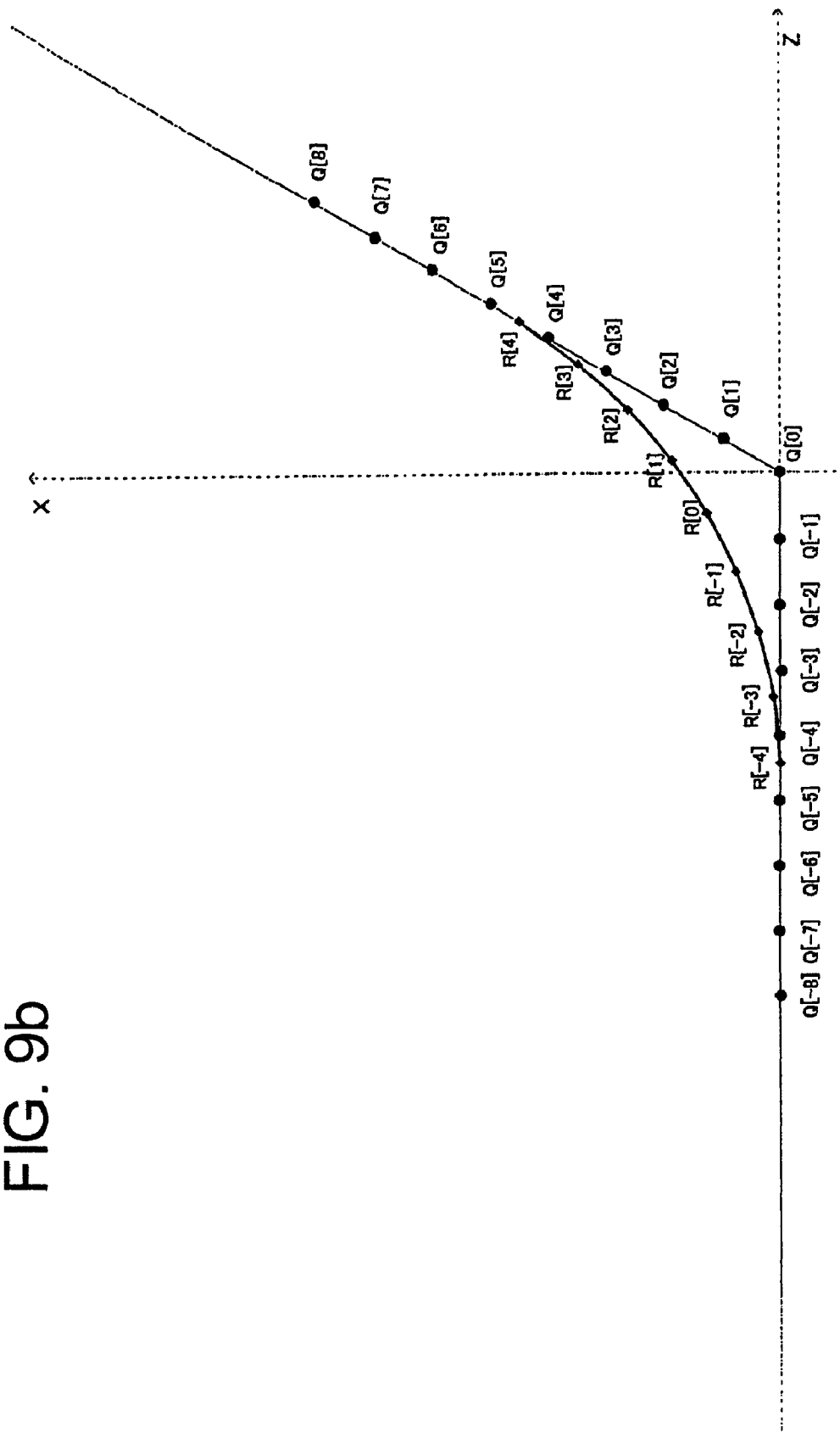
FIG. 9b illustrates functions and effects of the collision preventing device according to the second embodiment.

The local acceleration/deceleration simulating unit 44 performs acceleration/deceleration processing on the interpolation points according to a method similar to that used by the acceleration/deceleration units 18*x* and 18*z*. In the acceleration/deceleration processing, the local acceleration/deceleration simulating unit 44 uses an acceleration/deceleration time constant similar to that used by the acceleration/deceleration units 18*x* and 18*z*, to perform the entire processing for accelerating/decelerating respective axes. The local acceleration/deceleration simulating unit 44 performs acceleration/deceleration processing on each interpolation point Q illustrated in FIG. 9*b*. On the other hand, the acceleration/deceleration units 18*x* and 18*z* successively perform acceleration/deceleration processing on interpolated positions in the entire command region of the target block. As a result, the local acceleration/deceleration simulating unit 44 can determine acceleration/deceleration processed command points R[−T'] to R[+T'] as illustrated in FIG. 9*b* (in the present embodiment, T'=T/2).

The reason why the collision preventing device according to the present embodiment includes two "local" simulating units as described above is because a "deviation" occurs only in the vicinity of a moving direction changing position and the moving locus coincides with the commanded locus in a distant place. Therefore, it is unnecessary to perform the simulation beforehand in such a distant place.

A check target selection unit 46 selects command points to be subjected to the interference check from the command points R[−T'] to R[+T']. The collision preventing device according to the present embodiment provides an allowance amount that can be used to regard a locus as a straight line (i.e., linearization allowance amount 48). The check target selection unit 46 excludes any point within the allowable range from the candidates to be subjected to the interference check. Thus, the collision preventing device according to the present embodiment can reduce calculation time required for the interference check. A detailed method is described below. The check target selection unit 46 sends the selected command points as a straight path, which are arrayed in the moving direction, to the interference checking unit 26.

The interference checking unit 26 executes interference check based on the input path and position data according to a method similar to that used in the conventional art illustrated in FIG. 6.

Similar to the above-described processing for the target position P[0], the collision preventing device according to the present embodiment can successively execute interference check processing for all target positions P designated by the part program 10.

The check target selection unit 46 selects command points according to the following method. First, if the distance between P[0] and R[0] is equal to or less than the linearization allowance amount 48 (if a deviation is extremely small), the check target selection unit 46 regards only the command point P[0] of the program as a check target. (The obtained result is similar to that in the conventional art.)

If the distance between P[0] and R[0] is larger than the linearization allowance amount 48, the check target selection unit 46 selects check targets from the R point group. In this case, the check target selection unit 46 selects both endpoints R[−T'] and R[+T'] in the processing range as check targets because these end points serve as a start point and an end point in the following processing. Then, the check target selection unit 46 starts the processing with two points R[−T'] and R[+T'] being set as initial values according to a 2-division method. First, the check target selection unit 46 obtains a distance from the central point R[0] (i.e., a midpoint existing between the above-described points R[−T'] and R[+T']) to a line segment R[−T']→R[+T'] (i.e., a straight line connecting the above-described points R[−T'] and R[+T']). If the obtained distance is equal to or less than the linearization allowance amount 48, the check target selection unit 46 does not select the point R[0] as a check target and terminates the processing.

If the obtained distance is larger than the linearization allowance amount 48, the check target selection unit 46 selects the point R[0] as a check target. Further, the check target selection unit 46 performs similar processing in the first part ranging from the point R[−T'] to the point R[0] to check R points existing in this range. In parallel, the check target selection unit 46 performs similar processing in the second part ranging from the point R[0] to the point R[+T'] to check R points existing in this range. The check target selection unit 46 terminates the above-described processing according to the 2-division method if a midpoint existing between two end points is not selected as a check target or if there is no midpoint to be checked.

Figure 9C:
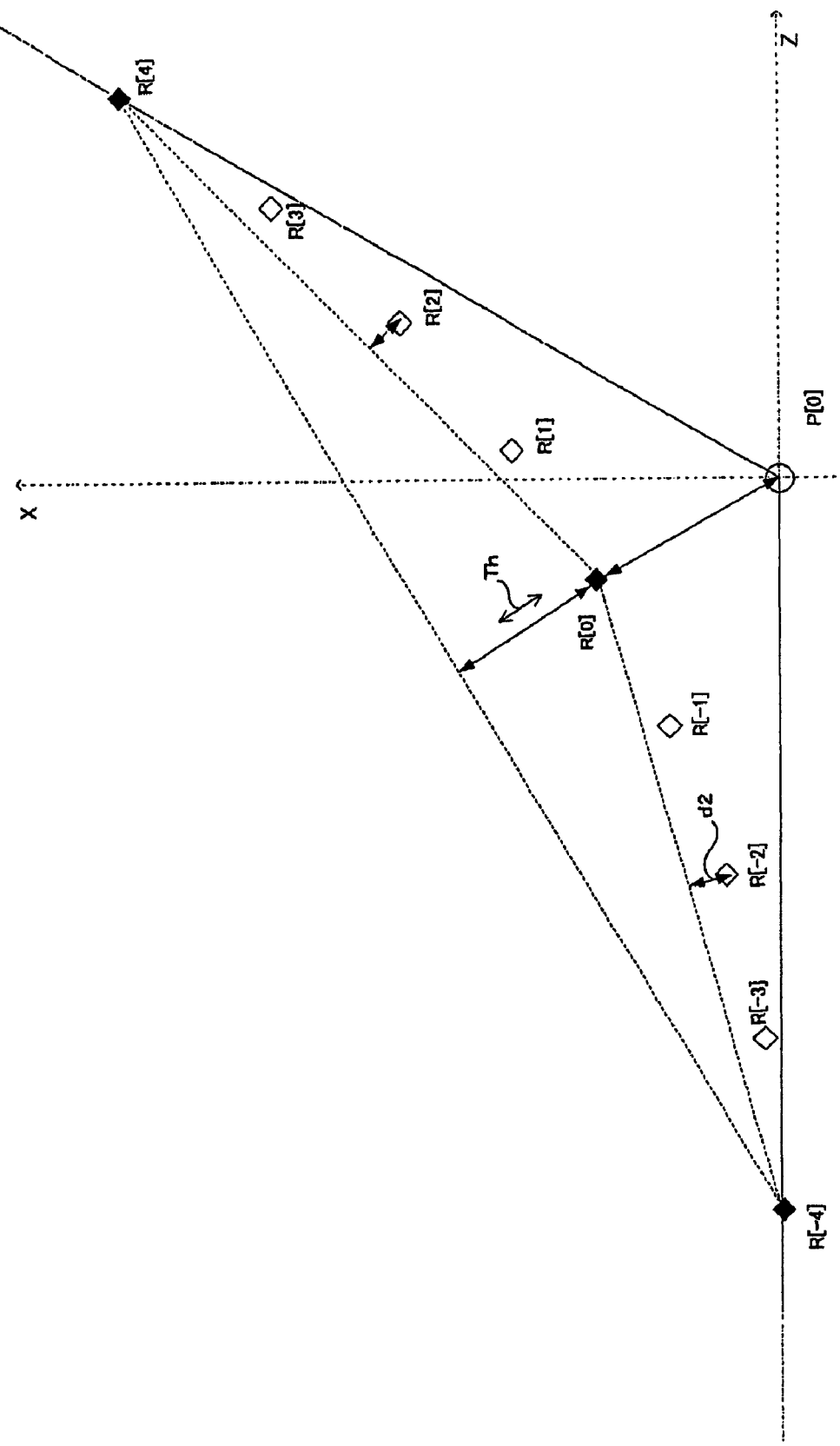
FIG. 9c illustrates functions and effects of the collision preventing device according to the second embodiment.

FIG. 9c illustrates a practical example. If the linearization allowance amount 48 is equal to the length indicated by an arrow Th, the check target selection unit 46 selects points each indicated by a black rhomboidal mark ♦ check targets from the R point group. For example, a distance d2 between the point R[−2] and the line segment R[−4]·R[0] is less than the linearization allowance amount (Th). Therefore, the check target selection unit 46 does not select the point R[−2] as a check target.

Figure 9D:
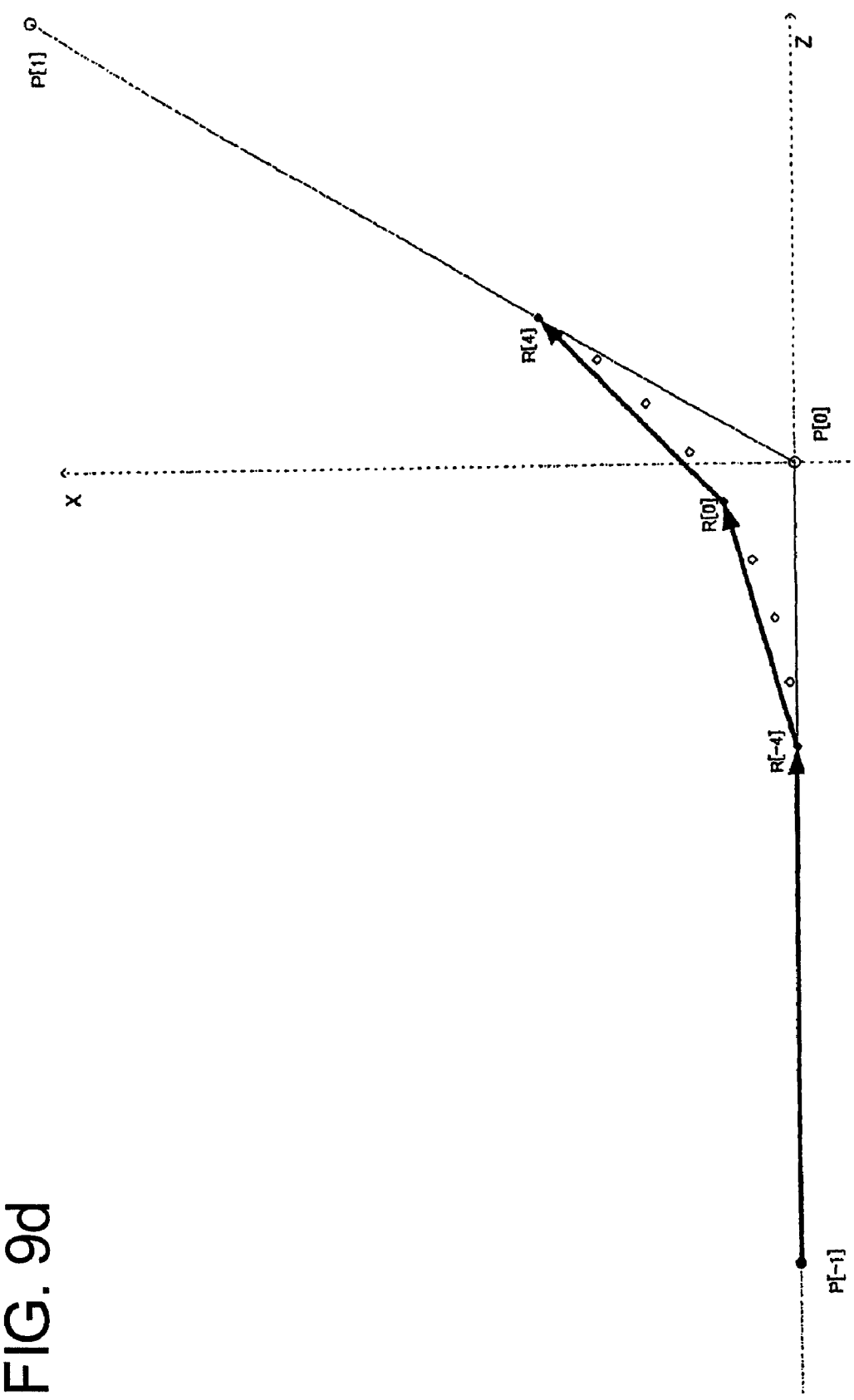
FIG. 9d illustrates functions and effects of the collision preventing device according to the second embodiment.

As a result of the above-described processing performed by the check target selection unit 46, the interference checking unit 26 according to the present embodiment can execute interference check along a path P[−1]→R[−4]→R[0]→R[4] indicated by bold arrows in FIG. 9d. In other words, the interference checking unit 26 can execute interference check along the path adjacent to an actual moving path of the tool.

Figure 3:
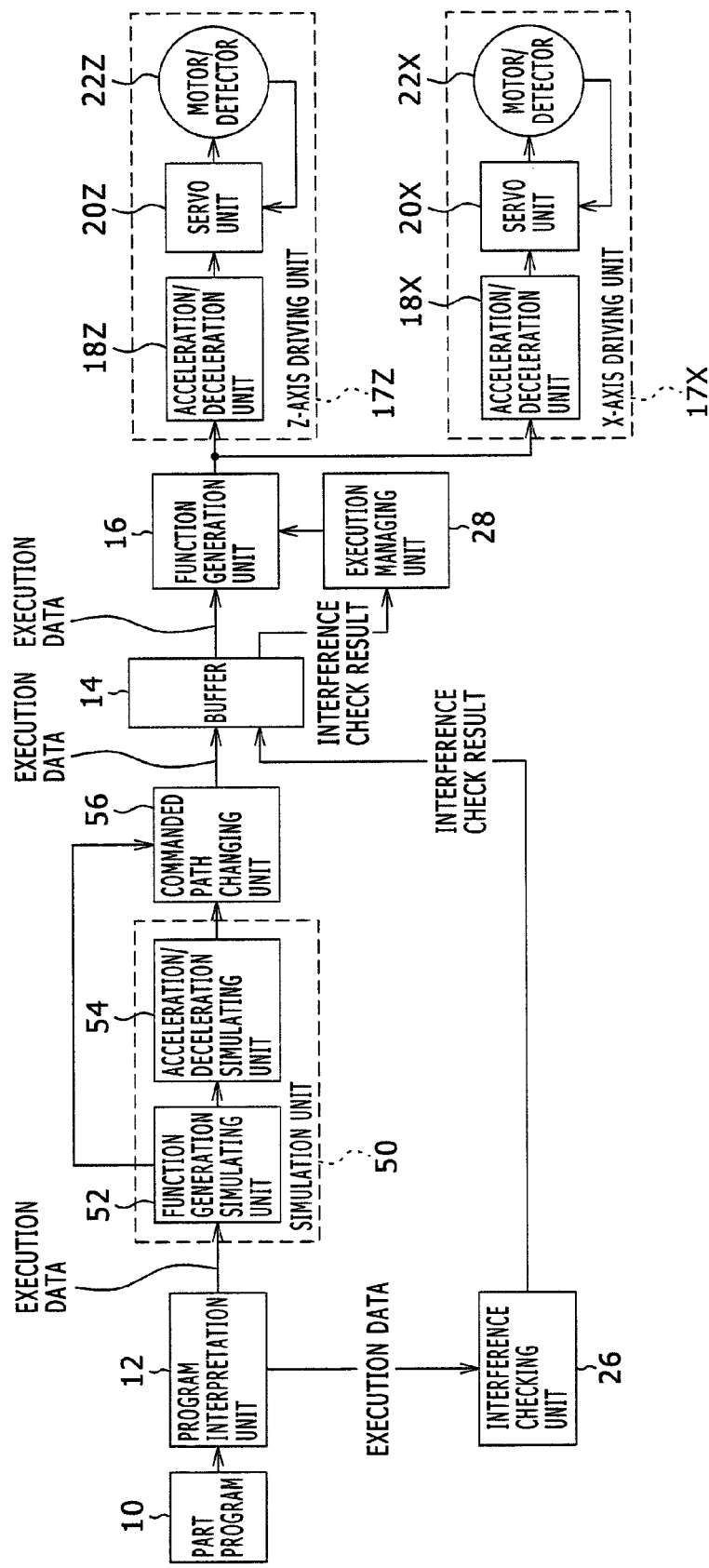
FIG. 3 is a functional block diagram illustrating an example of a configuration of a collision preventing device incorporated in a numerical control apparatus according to a third embodiment.

FIG. 3 illustrates a configuration of a collision preventing device incorporated in a numerical control apparatus according to another embodiment of the present invention, which relates to claim 3. In FIG. 3, constituent components similar to those of the conventional art illustrated in FIG. 6 are denoted using the same reference numerals and names.

Similar to the above-described conventional apparatus, the collision preventing device according to the present embodiment executes interference check on a commanded locus. If it is determined that any interference may occur in a target block, the collision preventing device does not execute function generation processing for the target block and stops the machine tool before the machine tool collides with an interfering object.

On the other hand, if it is determined that there is no interference in the target block, the collision preventing device executes function generation processing along a path changed by a below-described commanded path changing unit 56 according to the present invention, and outputs a moving command for each function generation period.

A simulation unit 50 includes a function generation simulating unit 52 and an acceleration/deceleration simulating unit 54. The function generation simulating unit 52 performs processing similar to that performed by the function generation unit 16 according to the above-described conventional art. The acceleration/deceleration simulating unit 54 performs processing similar to that performed by the acceleration/deceleration units 18x and 18z provided in the axis driving units 17x and 17z. The simulation unit 50 can estimate a deviation of a moving locus relative to a commanded locus.

The commanded path changing unit 56 obtains a difference between the commanded locus output from the function generation simulating unit 52 and the "deviated" moving locus obtained by the acceleration/deceleration simulating unit 54. Then, the commanded path changing unit 56 generates a new commanded locus to cancel the estimated "deviation" based on the obtained difference. If the interference checking unit 26 determines that no interference occurs, the function generation unit 16 functionally generates the new commanded locus. If the interference checking unit 26 determines that interference may occur, the execution managing unit 28 inhibits the function generation unit 16 from performing interpolation processing and generates a warning in a manner similar to the conventional art.

An operation of the collision preventing device according to the present embodiment to be performed in a situation illustrated in FIG. 7b is described below with reference to FIGS. 10a to 10d. In the present embodiment, the acceleration/deceleration units 18x and 18z and the acceleration/deceleration simulating unit 54 have a similar time constant composed of eight periods.

Figure 10A:
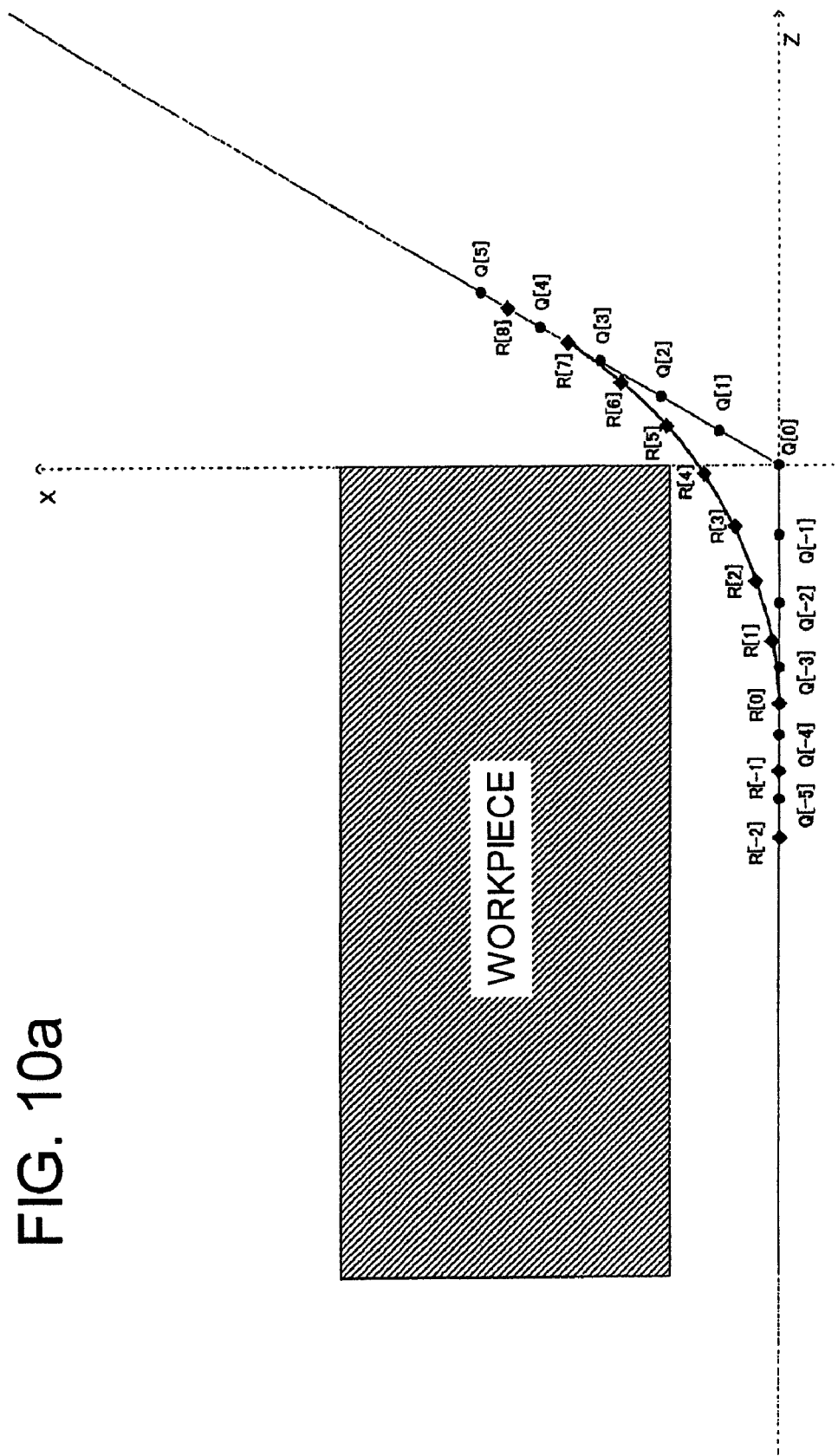
FIG. 10a illustrates functions and effects of the collision preventing device according to the third embodiment.

FIG. 10a illustrates a simulated result generated by the above-described simulating units 52 and 54, although an illustrated range is limited to the data in the vicinity of the point P[0]. The program interpretation unit 12 interprets both the N010 block and the N011 block to determine path data that can be functionally generated and execution data with respect to the feed speed. The function generation simulating unit 52 performs function generation based on the data determined by the program interpretation unit 12 and outputs a point group Q[n]. The acceleration/deceleration simulating unit 54 performs acceleration/deceleration processing on the point group Q[n] to output a point group R[n].

Figure 10B:
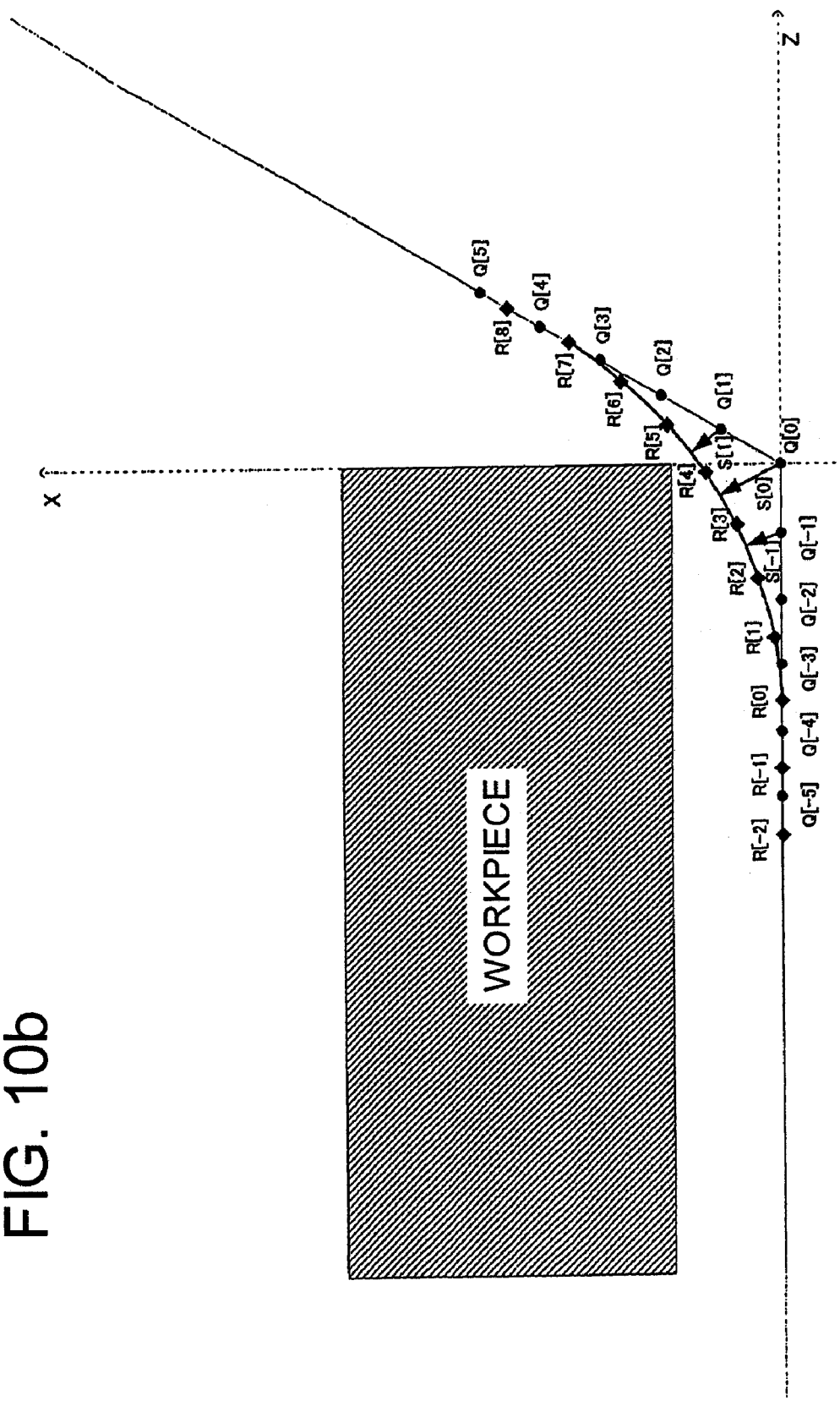
FIG. 10b illustrates functions and effects of the collision preventing device according to the third embodiment.

The commanded path changing unit 56 receives the point group Q[n] and the point group R[n] illustrated in FIG. 10a, and measures a deviation of each point Q. The deviation of each point Q can be defined by a distance from the point Q to a path connecting mutually neighboring R points. A vector S[n] illustrated in FIG. 10b represents a measured deviation of the point Q. In FIG. 10b, points Q[−5], Q[−4], Q[4], and Q[5] have no deviation (i.e., deviation=0) and points Q[−3], Q[−2], Q[2], and Q[3] have small and negligible deviations (not illustrated in FIG. 10b).

Figure 10C:
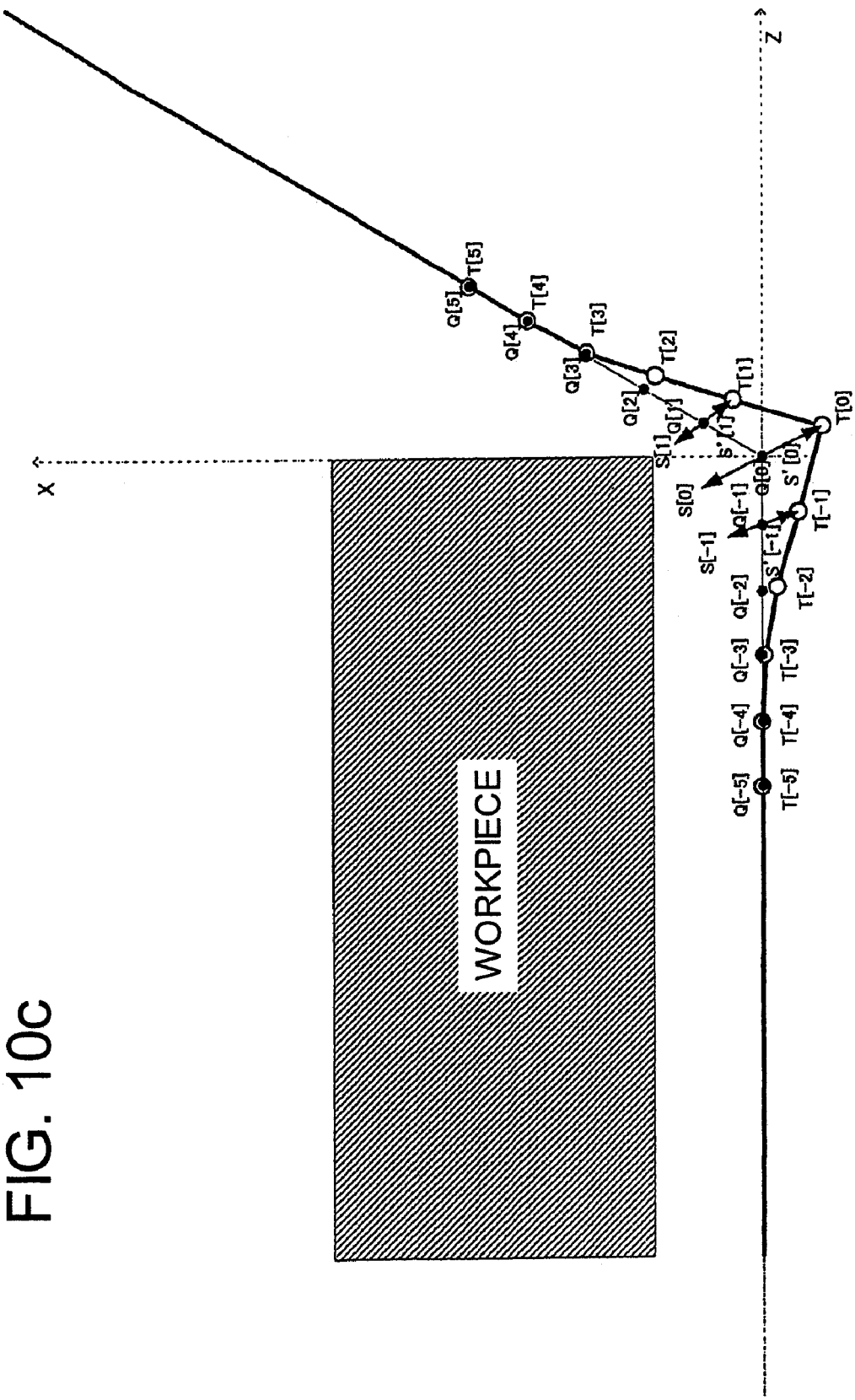
FIG. 10c illustrates functions and effects of the collision preventing device according to the third embodiment.
Figure 10D:
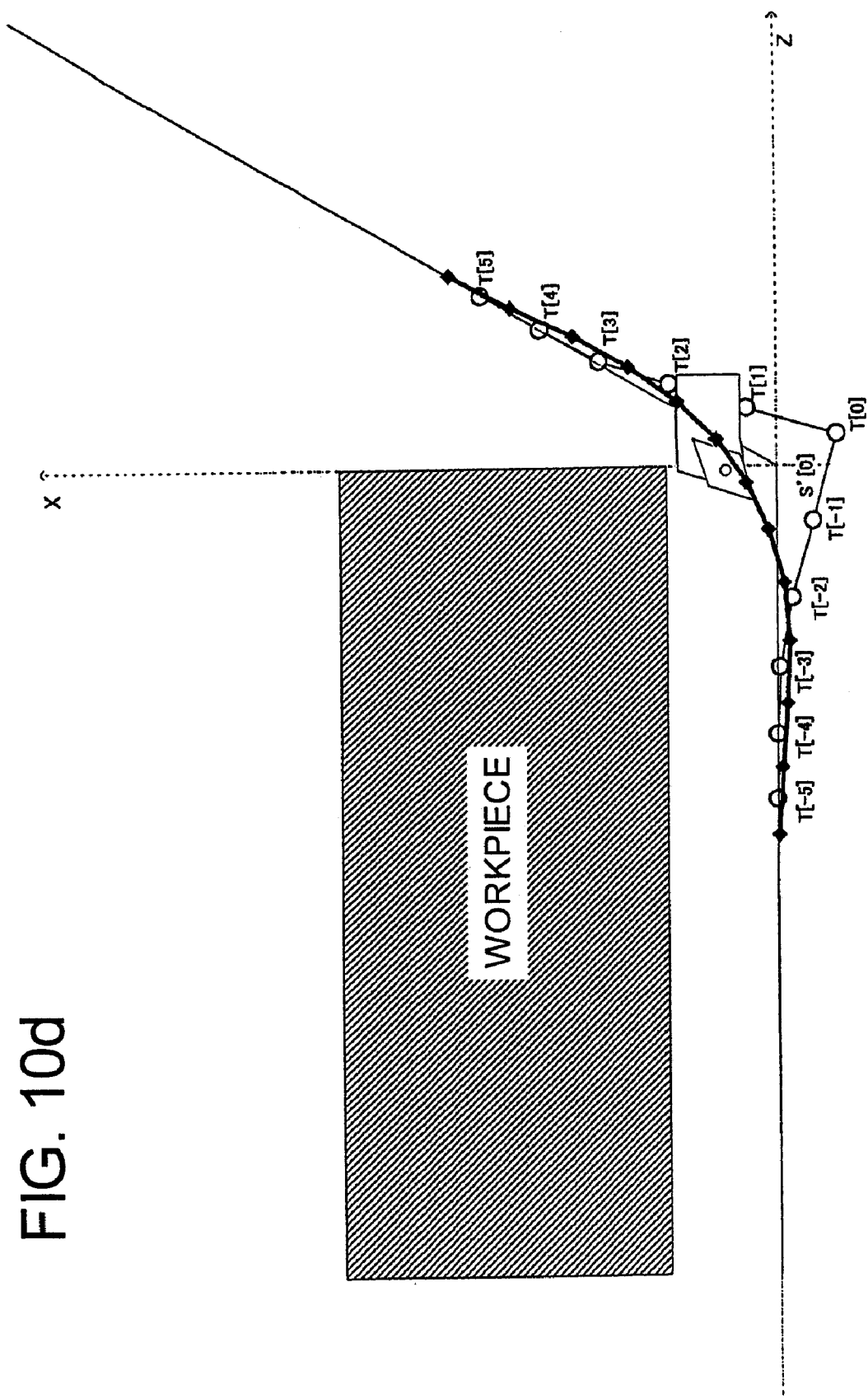
FIG. 10d illustrates functions and effects of the collision preventing device according to the third embodiment.

Subsequently, the commanded path changing unit 56 adds a vector S'[n] to each point Q[n] to create a point T[n]. In this case, the vector S'[n] and the vector S[n] are identical in magnitude and opposite in direction, as illustrated in FIG. 10c.

The commanded path changing unit 56 replaces the commanded locus defined by the part program 10 with a locus defined by the point group T. The point group T is stored as a new locus in the buffer 14. The function generation unit 16 performs function generation on the new locus defined by the point group T and outputs the new locus to respective axis driving units 17x and 17z. The axis driving units 17x and 17z perform acceleration/deceleration processing on the new locus to obtain a moving locus (i.e., a path connecting sequential points each indicated by a black rhomboidal mark ♦ in FIG. 10d) whose deviation is sufficiently smaller compared to that of the program commanded locus. In short, the collision preventing device according to the present embodiment can reduce a deviation amount of an actual moving locus relative to the commanded locus defined by the part program 10. Therefore, compared to the conventional apparatus, the collision preventing device according to the present embodiment can accurately prevent the machine tool from colliding with any interfering object even when the interference checking unit 26 performs interference check on the commanded locus defined by the part program 10.

Figure 4:
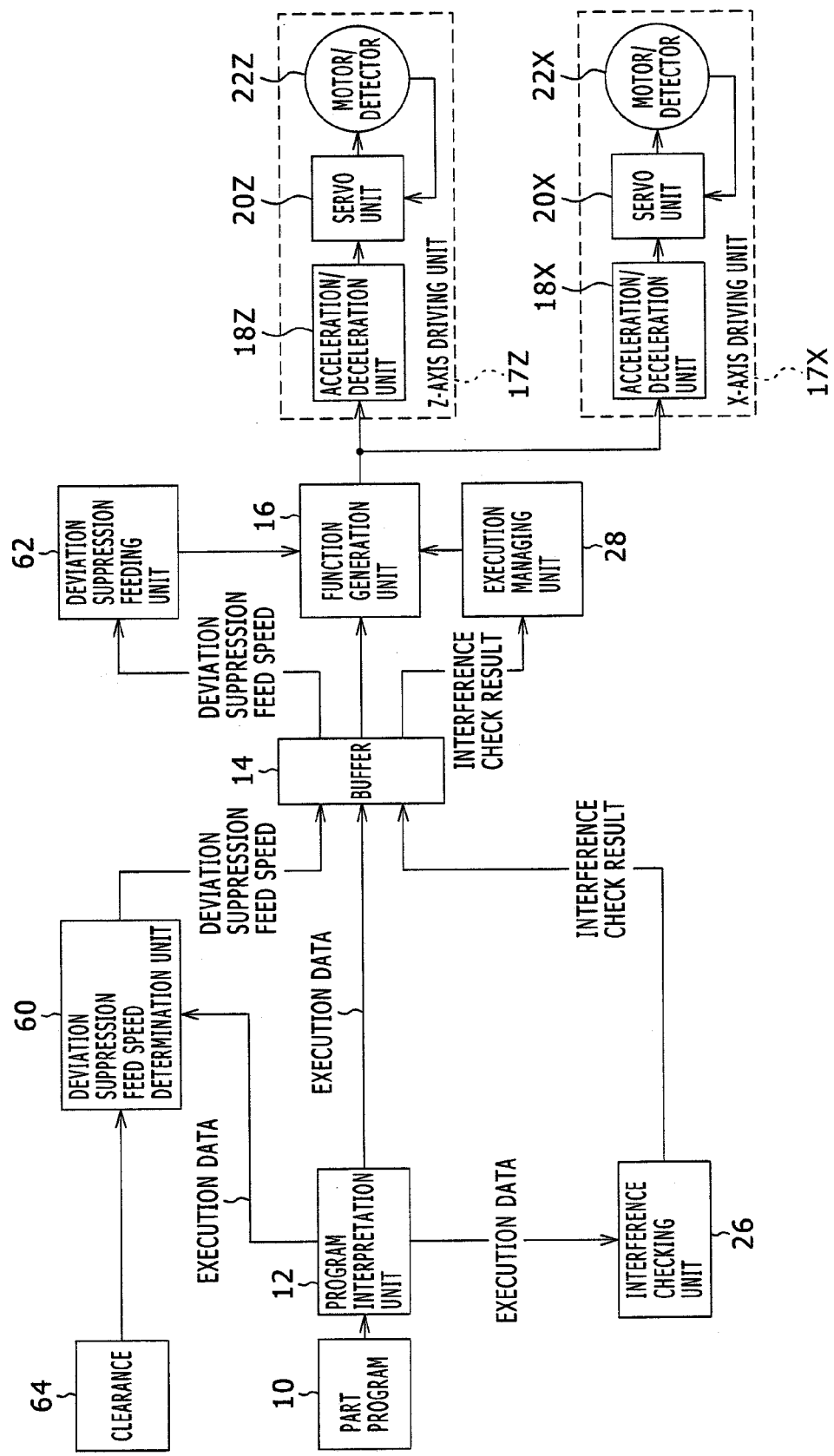
FIG. 4 is a functional block diagram illustrating an example of a configuration of a collision preventing device incorporated in a numerical control apparatus according to a fourth embodiment.

FIG. 4 illustrates a configuration of a collision preventing device incorporated in a numerical control apparatus according to another embodiment of the present invention, which relates to claim 4. In FIG. 4, constituent components similar to those of the conventional art illustrated in FIG. 6 are denoted using the same reference numerals and names.

Similar to the above-described conventional apparatus, the collision preventing device according to the present embodiment executes interference check on a commanded locus. If it is determined that any interference may occur in a target block, the collision preventing device does not execute function generation processing for the target block and stops the machine tool before the machine tool collides with an interfering object.

On the other hand, if it is determined that there is no interference in the target block, the collision preventing device executes function generation processing for the target block and outputs a moving command for each function generation period. The collision preventing device according to the present embodiment adjusts the feed speed according to an instruction supplied from a deviation suppression feeding unit 62 to reduce the deviation amount to a level equal to or less than a clearance amount 64 before the function generation unit 16 executes function generation. The feed speed required to reduce the deviation amount to the level equal to or less than the clearance amount 64 is referred to as "deviation suppression feed speed."

In general, a deviation that may be caused by acceleration/deceleration processing is dependent on the feed speed, the acceleration/deceleration time constant, and a direction turning angle. The direction turning angle is an angle formed at a position where the moving direction is changed. According to the example illustrated in FIG. 7a, the direction turning angle is an angle of a line extending from the point P[0] to the point P[1] relative to a line extending from the point P[−1] to the point P[0]. More specifically, the direction turning angle is equal to 60 degrees. The direction turning angle can be determined when a commanded path according to the program is once confirmed. The acceleration/deceleration time constant is required to be similar to the value used by the acceleration/deceleration units 18x and 18z provided in the axis driving units 17x and 17z. Therefore, the acceleration/deceleration time constant cannot be changed. Accordingly, to reduce an amount of the deviation to be a value within an allowable range, the collision preventing device according to the present embodiment adjusts the feed speed. A deviation suppression feed speed determination unit 60 calculates the deviation suppression feed speed with reference to the commanded path (i.e., the direction turning angle) according to the following formula 1.

$$f = \frac{8\varepsilon}{\tau\sqrt{2(1-\cos\theta)}}$$ [Numerical Expression 1]

ε: clearance amount
τ: is acceleration/deceleration time constant
θ: direction turning angle The clearance amount, which indicates an allowable deviation amount, can be determined beforehand based on characteristics (e.g., interference check error) in function and performance of the interference checking unit 26.

The deviation suppression feeding unit 62 instructs the deviation suppression feed speed to the function generation unit 16 before the function generation unit 16 performs function generation that causes a turning of the direction. The function generation unit 16 performs function generation at an instructed speed in a range extending from a direction turning point by the length comparable to f×τ in both forward and backward directions. Therefore, the collision preventing device according to the present embodiment can reduce the deviation amount of an actual moving path to a level equal to or less than the clearance amount in the vicinity of the direction turning point. Therefore, compared to the conventional apparatus, the collision preventing device according to the present embodiment can accurately prevent the machine tool from colliding with any interfering object even when the interference checking unit 26 performs interference check on the commanded locus defined by the part program 10.

Figure 5:
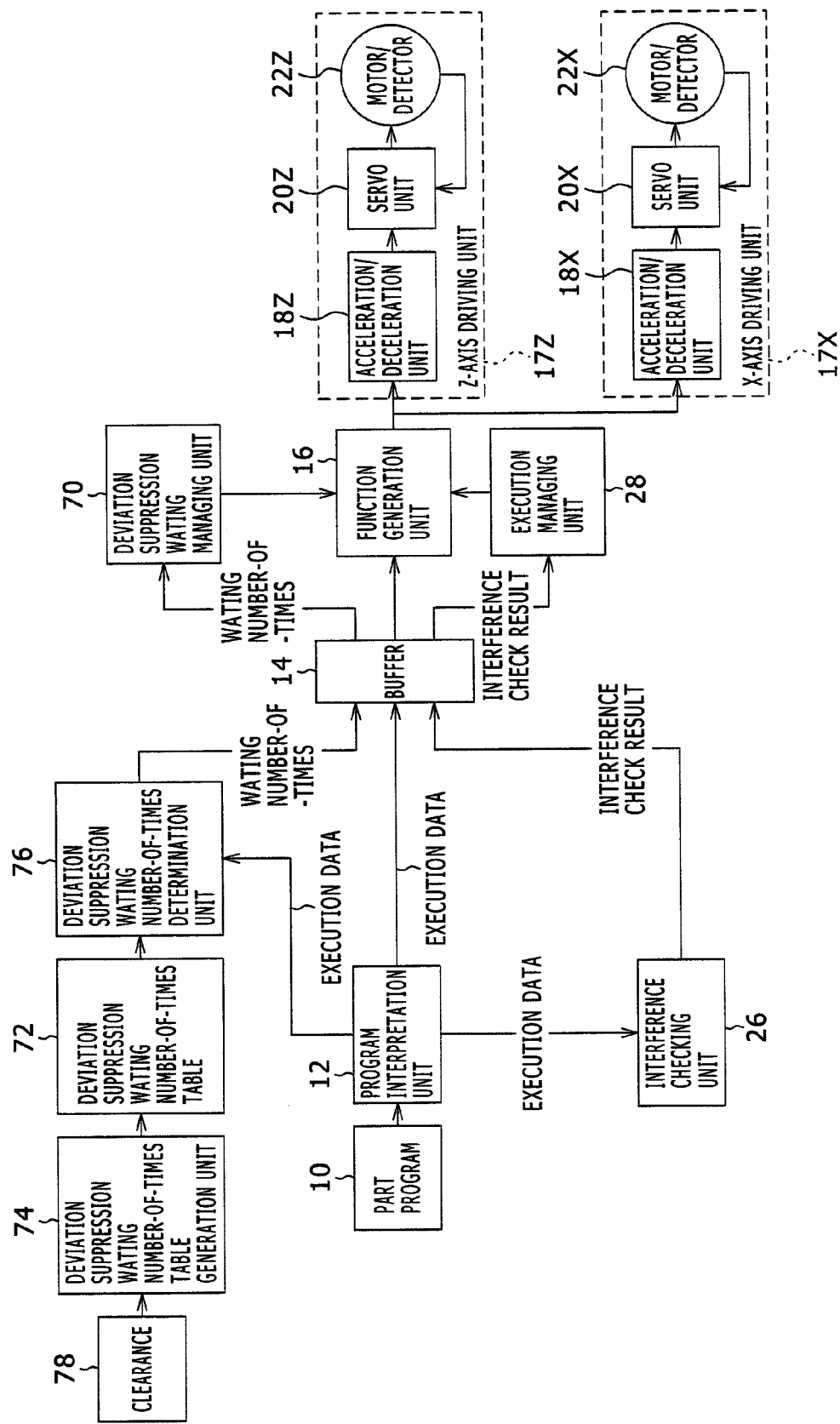
FIG. 5 is a functional block diagram illustrating an example of a configuration of a collision preventing device incorporated in a numerical control apparatus according to a fifth embodiment.

FIG. 5 illustrates a configuration of a collision preventing device incorporated in a numerical control apparatus according to another embodiment of the present invention, which relates to claim 5. In FIG. 5, constituent components similar to those of the conventional art illustrated in FIG. 6 are denoted using the same reference numerals and names.

Similar to the above-described conventional apparatus, the collision preventing device according to the present embodiment executes interference check on a commanded locus. If it is determined that any interference may occur in a target block, the collision preventing device does not execute function generation processing for the target block and stops the machine tool before the machine tool collides with an interfering object.

On the other hand, if it is determined that there is no interference in the target block, the collision preventing device waits for a predetermined time corresponding to the number of times of the function generation period instructed by a below-described deviation suppression waiting managing unit 70 according to the present embodiment. After the above-described time has elapsed, the collision preventing device executes function generation processing for the target block and outputs a moving command for each function generation period.

A deviation suppression waiting number-of-times table 72 stores numerical data with respect to the deviation suppression waiting number-of-times in relation to the direction turning angle. Table 1 illustrates an example of the deviation suppression waiting number-of-times table 72. The waiting number-of-times is a value that can be counted in the units of the function generation period. If the waiting number-of-times is 0, the collision preventing device executes function generation without any waiting period. Namely, after completing the function generation processing for the present block, the collision preventing device starts function generation processing for the subsequent block in the next function generation period. If the waiting number-of-times is 1, the collision preventing device skips the next function generation one time. More specifically, after completing the function generation processing for the present block, the collision preventing device does not execute any function generation in the next function generation period. Then, in a period following the skipped period, the collision preventing device starts function generation processing for the next block.

TABLE 1

| (KEY) DIRECTION TURNING ANGLE θ DEGREE | (DATA) WAITING NUMBER OF TIMES |
|---|---|
| 0 | 0 |
| 10 | 0 |
| 20 | 1 |
| 30 | 2 |
| . | . |
| . | . |
| . | . |
| 170 | 8 |
| 180 | 8 |

A deviation suppression waiting number-of-times table generation unit 74 evaluates the deviation amount by simulating the acceleration/deceleration units 18x and 18z of respective axes, which are the factors having large influence on the deviation, and its front stage for positioning function generation. Then, the deviation suppression waiting number-of-times table generation unit 74 generates the deviation suppression waiting number-of-times table 72 based on the obtained evaluation result. The deviation suppression waiting number-of-times table generation unit 74 can not only simulate the processing but also accurately evaluate the deviation amount using appropriate parameters (e.g., actual acceleration/deceleration time constant in the acceleration/deceleration processing and actual feed speed in the function generation). A detailed procedure of the processing to be performed by the deviation suppression waiting number-of-times table generation unit 74 is described below.

The above-described simulation requires a great amount of calculation. However, the deviation suppression waiting number-of-times table generation unit 74 can execute the required calculations as a part of initialization processing. Therefore, the above-described simulation does not substantially interrupt an actual operation of the numerical control apparatus (e.g., operations in an interpretation-related portion and an execution-related portion described below).

A deviation suppression waiting number-of-times determination unit 76 selects a waiting number-of-times corresponding to the direction turning angle from the deviation suppression waiting number-of-times table 72. The direction turning angle is an angular change in the moving direction between the present block and the previous block. For example, if the moving direction of the present block is identical to the moving direction of the previous block, the direction turning angle is equal to 0 degrees. If the moving direction of the present block is opposite to the moving direction of the previous block, the direction turning angle is equal to 180 degrees. The moving direction can be expressed using the moving vector that is one of the execution data. The direction turning angles listed in Table 1 are discrete values. If the direction turning angle is 15 degrees, the deviation suppression waiting number-of-times determination unit 76 selects a waiting number-of-times corresponding to 20 degrees because this angle is closest to 15 degrees. The selected waiting number-of-times is stored as one of the execution data relating to the present block in the buffer 14. The deviation suppression waiting number-of-times determination unit 76 performs processing in advance, similar to the "interpretation" processing for the block. Although there is a temporal constraint such that the function generation needs to be smoothly executed in the interpretation-related portion, the processing to be performed by the deviation suppression waiting number-of-times determination unit 76 is substantially negligible because it is comparable to table lookup processing.

The deviation suppression waiting managing unit 70 postpones the function generation processing for the target block with reference to a deviation suppression waiting number-of-times corresponding to the execution data. The deviation suppression waiting managing unit 70 operates in the manner described with reference to the deviation suppression waiting number-of-times table 72. The same execution-related portion can be used for the processing in the deviation suppression waiting managing unit 70 and the function generation unit 16. The execution-related portion executes processing at constant intervals (which corresponds to the function generation period). Therefore, the execution-related portion is required to complete the processing within the constant period. However, such a temporal constraint can be cleared because the above-described processing is comparable to the counting of waiting number-of-times.

Figure 11:
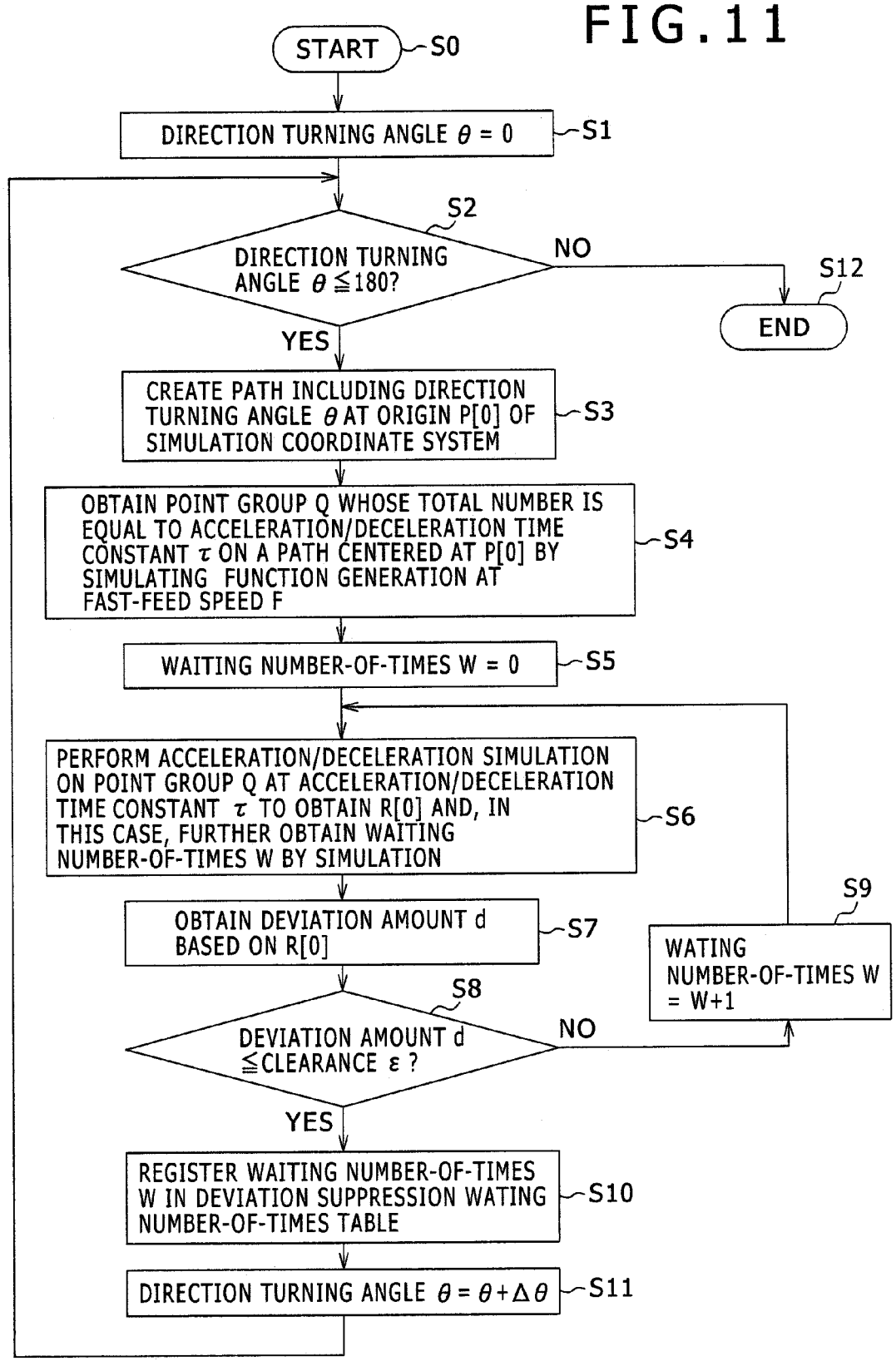
FIG. 11 is a flowchart illustrating an example of a procedure of processing that can be performed by the deviation suppression waiting number-of-times table generation unit.

An example of processing to be performed by the deviation suppression waiting number-of-times table generation unit 74 is described below with reference to a flowchart illustrated in FIG. 11 and graphs illustrated in FIGS. 12a to 12e.

The table stores numerical data corresponding to each direction turning angle θ ranging from 0 degrees to 180 degrees. Therefore, to successively obtain a waiting number-of-times corresponding to each direction turning angle θ, the flowchart illustrated in FIG. 11 includes steps S1, S2, and S11 for loop processing.

In step S3, to obtain a waiting number-of-times, the deviation suppression waiting number-of-times table generation unit 74 creates a path including a direction turning angle θ. More specifically, when a direction changing point P[0] coincides with the origin in a simulation coordinate system, the deviation suppression waiting number-of-times table generation unit 74 creates a reference path extending from the minus point P[−1] to the origin P[0] on the Z-axis and a direction changed path having the direction turning angle θ relative to the reference path. According to an example illustrated in FIG. 12a, the direction turning angle of the created path is equal to 60 degrees. The reason why the direction changing point P[0] is placed on the origin is because calculations can be simplified.

Figure 12A:
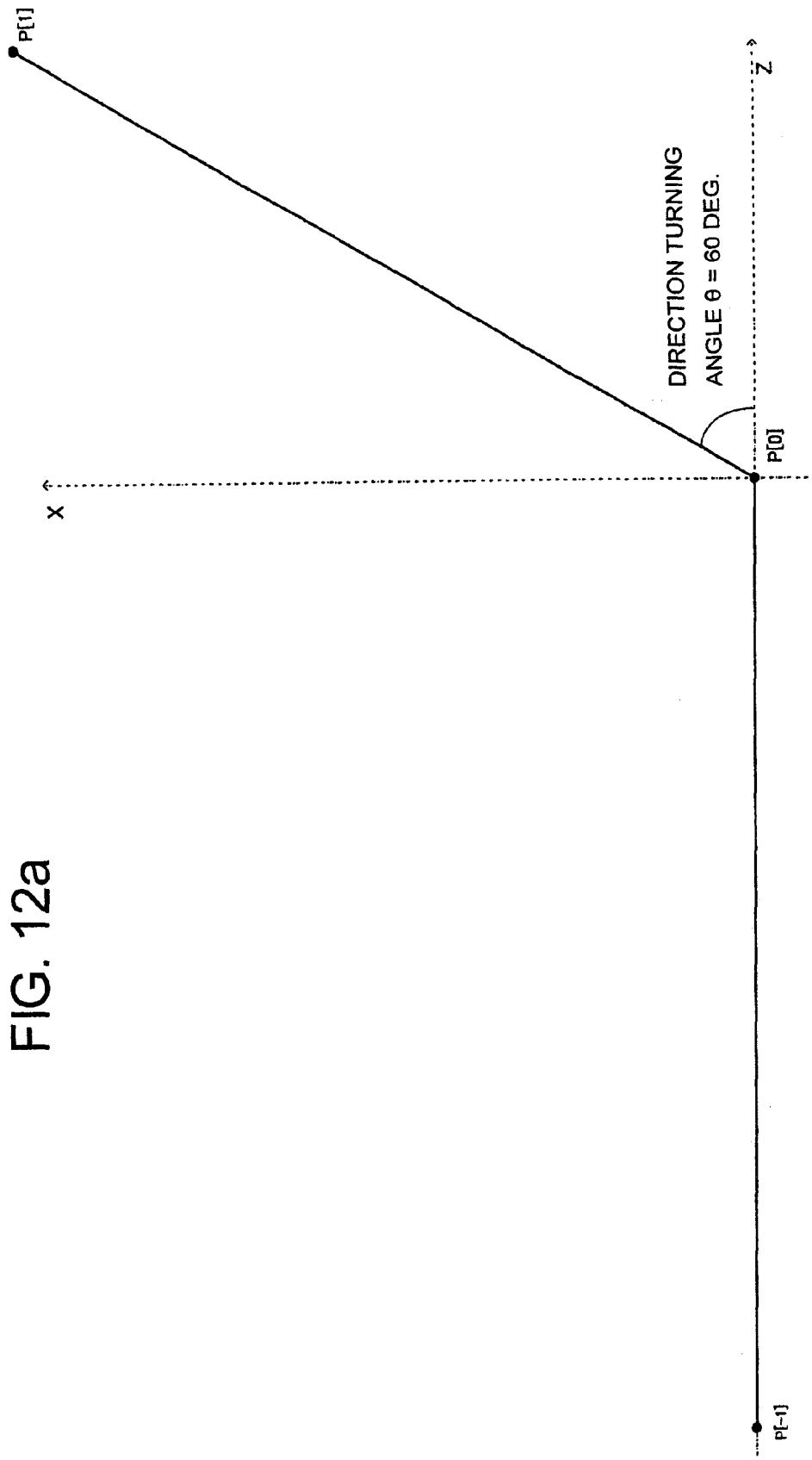
FIG. 12a illustrates processing that can be performed by the deviation suppression waiting number-of-times table generation unit.
Figure 12B:
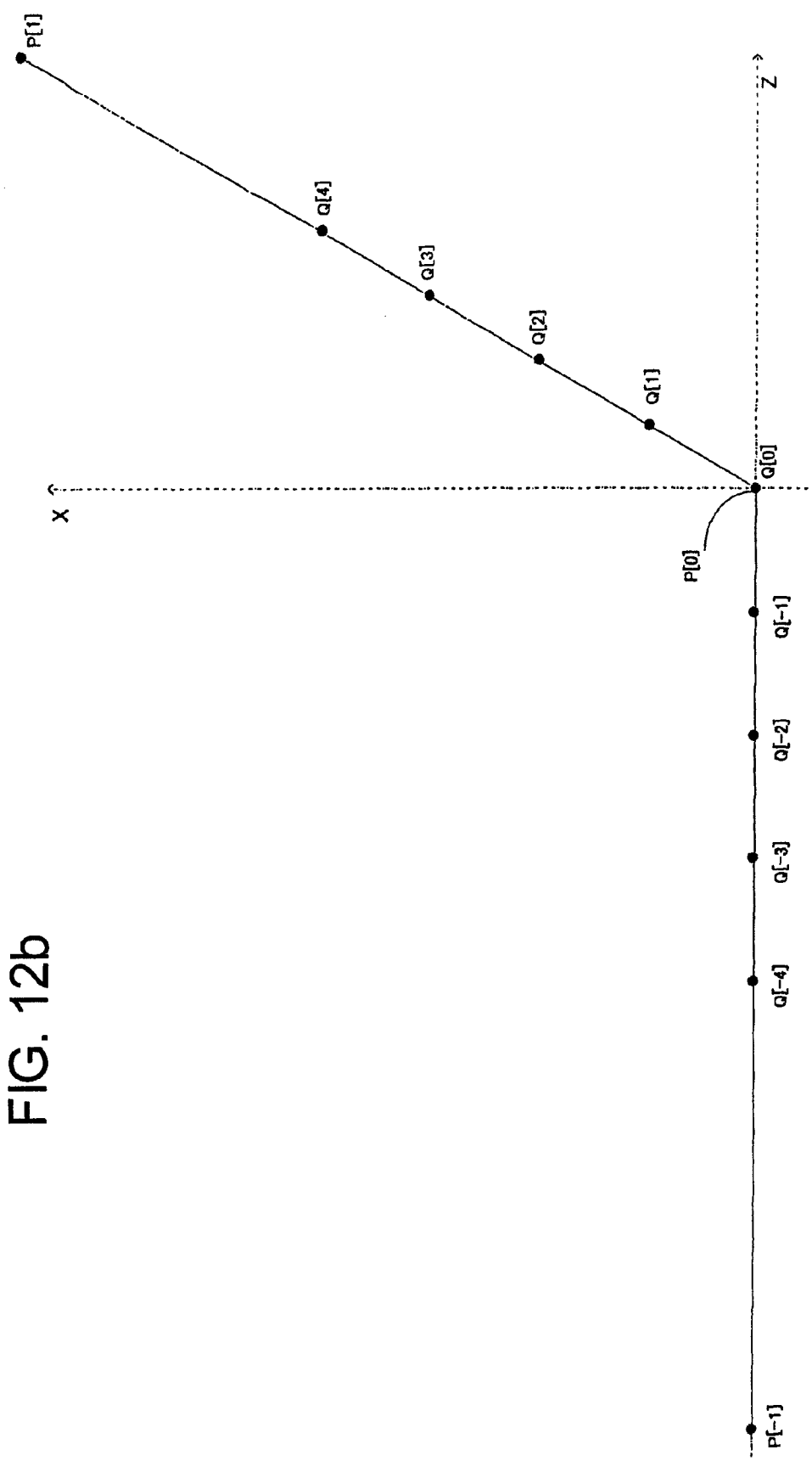
FIG. 12b illustrates processing that can be performed by the deviation suppression waiting number-of-times table generation unit.
Figure 12C:
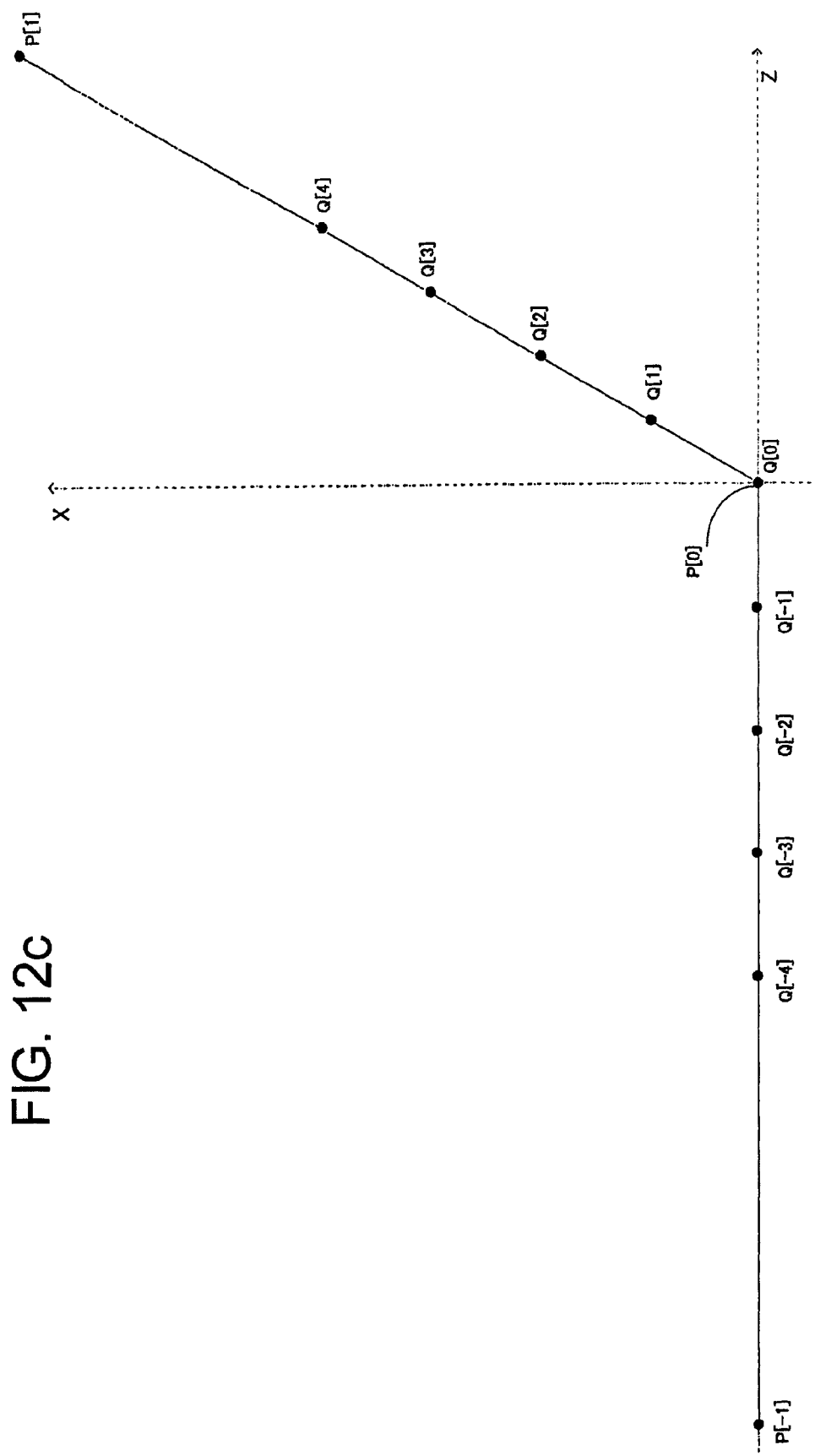
FIG. 12c illustrates processing that can be performed by the deviation suppression waiting number-of-times table generation unit.
Figure 12D:
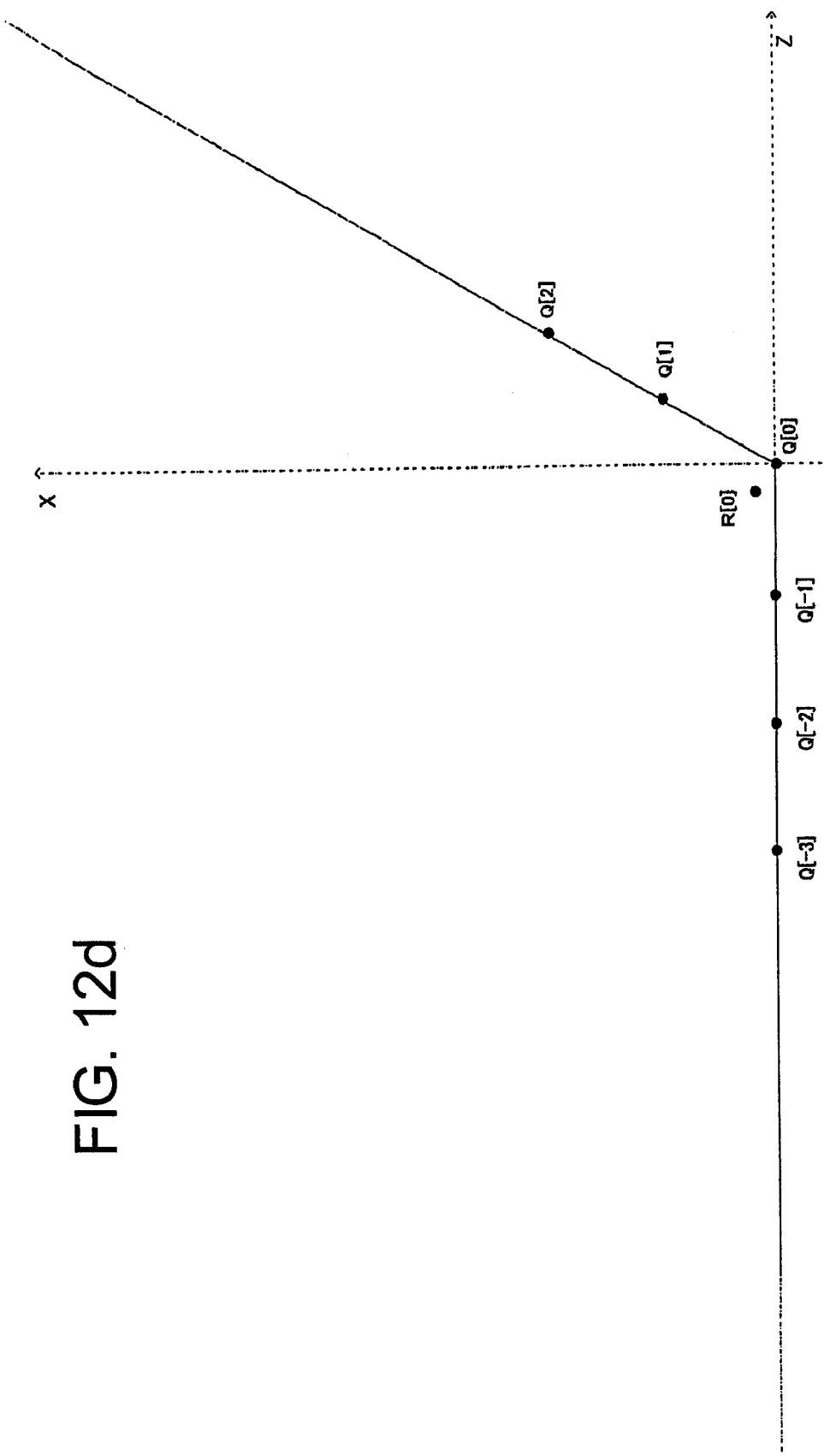
FIG. 12d illustrates processing that can be performed by the deviation suppression waiting number-of-times table generation unit.

Next, in step S4, the deviation suppression waiting number-of-times table generation unit 74 obtains a point group Q by simulating the positioning function generation at a fast-feed speed F. In this case, the number of points required to obtain the deviation amount is comparable to a time constant T for the next acceleration/deceleration simulation. A half of the points to be obtained (i.e., τ/2) are on the reference path extending from the point P[−1] to the origin P[0]. Another half of the points to be obtained (i.e., τ/2) are on the direction changed path extending from the origin P[0] to the point P[1]. FIG. 12b illustrates an example in the case of τ=9.

In step S5, the deviation suppression waiting number-of-times table generation unit 74 initializes a waiting number-of-times W to 0 before starting the simulation with respect to the waiting number-of-times.

In step S6, the deviation suppression waiting number-of-times table generation unit 74 performs acceleration/deceleration simulation. In a case where the waiting number-of-times W is 0 (W=0), the deviation suppression waiting number-of-times table generation unit 74 obtains R[0] as an average of the point group Q whose total number is equal to τ. If τ=9, the deviation suppression waiting number-of-times table generation unit 74 calculates an average of nine points Q[−4] to Q[4] (see FIG. 12c). If W=1 and τ=9, the deviation suppression waiting number-of-times table generation unit 74 replaces the point Q[4] with the central point Q[0] (=waiting factor) and then obtains an average of nine points (i.e., Q[−4], Q[−3], Q[−2], Q[−1], Q[0], Q[1], Q[2], Q[3], and 1×Q[0]). If W=2 and τ=9, the deviation suppression waiting number-of-times table generation unit 74 further replaces the point Q[−4] with the central point Q[0] and then obtains an average of nine points (i.e., Q[−3], Q[−2], Q[−1], Q[0], Q[1], Q[2], Q[3], and 2×Q[0]). If W=3 and τ=9, the deviation suppression waiting number-of-times table generation unit 74 further replaces the point Q[3] with the central point Q[0] and then obtains an average of nine points (i.e., Q[−3], Q[−2], Q[−1], Q[0], Q[1], Q[2], and 3×Q[0]) (see FIG. 12d). As is apparent from FIGS. 12c and 12d, the averaged point R[0] approaches to the origin P[0] with increasing rate of the waiting component. If the waiting number-of-times W is equal to the time constant τ, the averaged point R[0] coincides with the origin P[0].

Figure 12E:
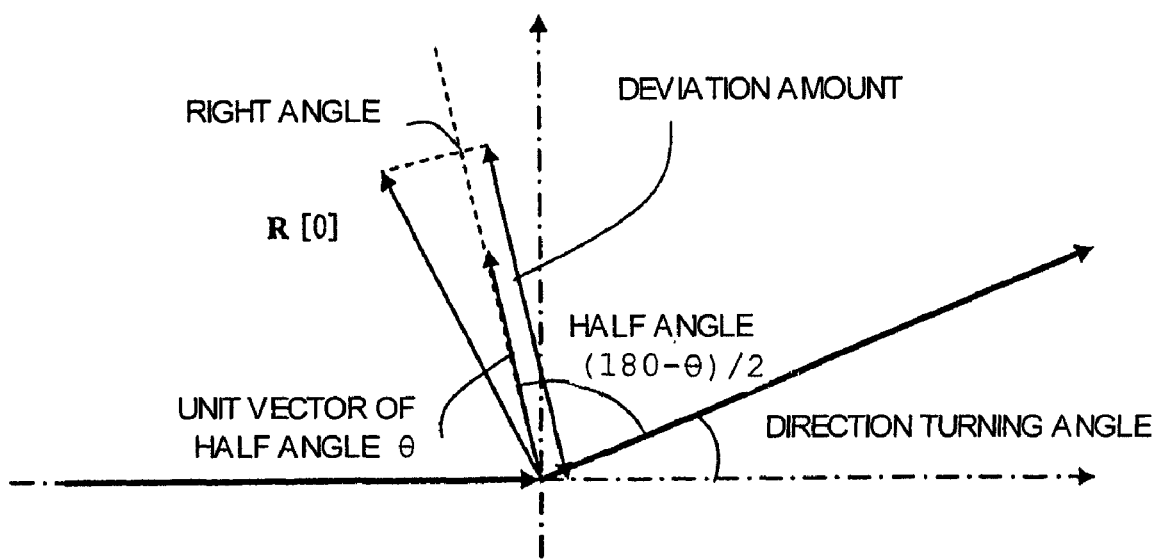
FIG. 12e illustrates processing that can be performed by the deviation suppression waiting number-of-times table generation unit.

Although the averaged point R[0] can be moved to a position adjacent to the origin P[0], the length of a vector P[0]→R[0] cannot be obtained as a value representing the deviation amount. Therefore, in step S7, the deviation suppression waiting number-of-times table generation unit 74 obtains a deviation amount "d" based on the averaged point R[0]. The deviation amount "d" can be measured along a line extending from the origin P[0] at a half angle of the turning angle formed between the path P[−1]→P[0] and the path P[0]→P[1]. The deviation amount "d" is equal to a distance of the vector R[0] projected on the above-described line. As illustrated in FIG. 12e, the deviation suppression waiting number-of-times table generation unit 74 obtains a unit vector h of the half angle direction based on the direction turning angle θ and calculates the deviation amount "d" as an inner product of the vector R[0] and the unit vector h.

In step S8, the deviation suppression waiting number-of-times table generation unit 74 evaluates the obtained deviation amount "d." If the deviation amount "d" is equal to or less than a clearance ϵ 78, then in step S10, the deviation suppression waiting number-of-times table generation unit 74 registers the waiting number-of-times W in the deviation suppression waiting number-of-times table 72. If the deviation amount "d" is greater than the clearance ϵ 78, then in step S9, the deviation suppression waiting number-of-times table generation unit 74 increments the waiting number-of-times W by 1. The processing returns to step S6.

As described above, the deviation suppression waiting number-of-times table 72 stores discrete values (values extracted at predetermined intervals) with respect to the direction turning angle. However, the deviation suppression waiting number-of-times table 72 can be modified in such a way as to increase the waiting number-of-times one by one, as long as a waiting number-of-times can be selected. Moreover, the direction turning angle is not limited to the above-described angle and can be replaced by any other comparable parameter, such as "cosine", which is simply variable in the range from 0 degrees to 180 degrees.

If it is determined that any interference may occur in a target block, the collision preventing device according to the present embodiment waits for a predetermined time corresponding to the number of times of the function generation period instructed by the deviation suppression waiting managing unit 70 and then executes function generation processing for the target block. Therefore, the deviation of a moving path in the vicinity of the direction turning point can be reduced to a level equal to or less than the clearance amount. Therefore, compared to the conventional apparatus, the collision preventing device according to the present embodiment can accurately prevent the machine tool from colliding with any interfering object even when the interference checking unit 26 performs interference check on the commanded locus defined by the part program 10.

REFERENCE NUMERAL LIST

10 . . . part program, 12 . . . program interpretation unit, 14 . . . buffer, 16 . . . function generation unit, 17x . . . X-axis driving unit, 17z . . . Z-axis driving unit, 18x, 18z . . . acceleration/deceleration unit, 20x, 20z . . . servo unit, 22x 22z . . . motor/detector, 26 . . . interference check unit, 28 . . . execution managing unit, 30 . . . acceleration/deceleration simulating unit, 32 . . . delay unit, 34 . . . second interference checking unit, 36 . . . moving command blocking unit.

The invention claimed is:

1. A collision preventing device incorporated in a numerical control apparatus comprising:
    a function generation unit that generates a moving command;
    an acceleration/deceleration processing unit that performs acceleration/deceleration processing of the moving command generated by the function generation unit for each axis to reduce an impact that may occur when a machine tool operates;
    a unit that performs interference check on a commanded path in advance and, if it is determined that interference may occur, prevents any collision by inhibiting the function generation unit from generating the moving command;
    an acceleration/deceleration simulating unit that performs acceleration/deceleration processing on the moving command generated by the function generation unit according to a method similar to that used by the acceleration/deceleration processing unit and obtains a moving path resulting from the acceleration/deceleration processing;
    an interference check unit that performs interference check between a mobile member and an interfering object along the moving path generated by the acceleration/deceleration simulating unit and determines whether any interference may occur;
    a delay unit that successively stores moving commands generated by the function generation unit and successively outputs a moving command having been stored a predetermined time before; and
    a moving command blocking unit that sends the moving command output from the delay unit to the acceleration/deceleration processing unit if the interference check unit determines that there is no interference and blocks the moving command to be sent from the delay unit to the acceleration/deceleration processing unit if the interference check unit determines that interference may occur,
    wherein the collision preventing device performs the interference check not only for the commanded path but also for the moving path output from the acceleration/deceleration simulating unit.

2. A collision preventing device incorporated in a numerical control apparatus comprising:
    a function generation unit that generates a moving command based on a numerical control program;
    an acceleration/deceleration processing unit that performs acceleration/deceleration processing of the moving command generated by the function generation unit for each axis to reduce an impact that may occur when a machine tool operates;
    a unit that performs interference check on a commanded path in advance and, if it is determined that interference may occur, prevents any collision by inhibiting the function generation unit from generating the moving command;
    a local simulation unit that simulates the function generation unit and the acceleration/deceleration processing unit according to a numerical control program in the vicinity of a target position commanded by the numerical control program; and
    a check target selection unit that selects a path to be subjected to the interference check based on the locus obtained by the local simulation unit and a linearization allowance amount that is designated beforehand, wherein the collision preventing device performs interference check between a mobile member and an interfering object along the selected path.

3. A collision preventing device incorporated in a numerical control apparatus, comprising:
- a function generation unit that generates a moving command based on a numerical control program;
- an acceleration/deceleration processing unit that performs acceleration/deceleration processing of the moving command generated by the function generation unit for each axis to reduce an impact that may occur when a machine tool operates;
- a unit that performs interference check on a commanded path in advance and, if it is determined that interference may occur, prevents any collision by inhibiting the function generation unit from generating the moving command;
- a simulation unit that simulates the function generation unit and the acceleration/deceleration processing unit according to the numerical control program; and
- a commanded path changing unit that changes a path of execution data so as to cancel a difference between the commanded path and the path obtained by the simulation unit,
- wherein the collision preventing device executes function generation based on the path changed by the commanded path changing unit and performs an operation along a moving path adjacent to the commanded path having been subjected to the interference check.

4. A collision preventing device incorporated in a numerical control apparatus, comprising:
- a function generation unit that generates a moving command;
- an acceleration/deceleration processing unit that performs acceleration/deceleration processing of the moving command generated by the function generation unit for each axis to reduce an impact that may occur when a machine tool operates;
- a unit that performs interference check on a commanded path in advance and, if it is determined that interference may occur, prevents any collision by inhibiting the function generation unit from generating the moving command;
- a deviation suppression feed speed determination unit that determines a feed speed to suppress a deviation within a predetermined clearance; and
- a deviation suppression feeding unit that controls the function generation unit to generate a moving command according to the feed speed determined by the deviation suppression feed speed determination unit,
- wherein the collision preventing device performs an operation along a moving path whose deviation relative to the commanded path having been subjected to the interference check is within a predetermined clearance.

5. A collision preventing device incorporated in a numerical control apparatus, comprising:
- a function generation unit that generates a moving command based on a numerical control program;
- an acceleration/deceleration processing unit that performs acceleration/deceleration processing of the moving command generated by the function generation unit for each axis to reduce an impact that may occur when a machine tool operates;
- a unit that performs interference check on a commanded path in advance and, if it is determined that interference may occur, prevents any collision by inhibiting the function generation unit from generating the moving command;
- a deviation suppression waiting number-of-times table that stores a deviation suppression waiting number-of-times according to a direction turning angle of the commanded path;
- a deviation suppression waiting number-of-times determination unit that selects a waiting number-of-times corresponding to a direction turning angle from the deviation suppression waiting number-of-times table when a command of the numerical control program is interpreted; and
- a deviation suppression waiting managing unit that delays start timing of function generation by an amount corresponding to the waiting number-of-times selected by the deviation suppression waiting number-of-times determination unit,
- wherein the collision preventing device performs an operation along a moving path whose deviation relative to the commanded path having been subjected to the interference check is within a predetermined clearance.

6. The collision preventing device incorporated in a numerical control apparatus according to claim 5, further comprising a deviation suppression waiting number-of-times table generation unit that evaluates a deviation amount by simulating the function generation unit and the acceleration/deceleration processing unit of each axis and registers a maximum function generation start waiting number-of-times, which is within the clearance, in the deviation suppression waiting number-of-times table.

* * * * *